(12) United States Patent
Takahashi et al.

(10) Patent No.: US 9,109,072 B2
(45) Date of Patent: Aug. 18, 2015

(54) CURABLE COMPOSITION AND USES THEREOF

(71) Applicant: SHOWA DENKO K.K., Minato-ku, Tokyo (JP)

(72) Inventors: Nobuyuki Takahashi, Minato-ku (JP); Yoshifumi Urakawa, Minato-ku (JP); Hideo Miyata, Minato-ku (JP); Shigeru Yamaki, Minato-ku (JP)

(73) Assignee: SHOWA DENKO K.K., Tokyo (JP)

( * ) Notice: Subject to any disclaimer, the term of this patent is extended or adjusted under 35 U.S.C. 154(b) by 0 days.

(21) Appl. No.: 14/376,219

(22) PCT Filed: Feb. 5, 2013

(86) PCT No.: PCT/JP2013/052591
§ 371 (c)(1),
(2) Date: Aug. 1, 2014

(87) PCT Pub. No.: WO2013/118713
PCT Pub. Date: Aug. 15, 2013

(65) Prior Publication Data
US 2014/0378571 A1    Dec. 25, 2014

(30) Foreign Application Priority Data
Feb. 10, 2012    (JP) ................. 2012-027498

(51) Int. Cl.
| | | |
|---|---|---|
| C08F 30/08 | (2006.01) | |
| C08F 2/44 | (2006.01) | |
| C08F 222/10 | (2006.01) | |
| C08F 230/08 | (2006.01) | |

(52) U.S. Cl.
CPC . C08F 30/08 (2013.01); C08F 2/44 (2013.01); C08F 222/1006 (2013.01); C08F 230/08 (2013.01)

(58) Field of Classification Search
None
See application file for complete search history.

(56) References Cited

U.S. PATENT DOCUMENTS

| | | | |
|---|---|---|---|
| 5,192,815 A * | 3/1993 | Okada et al. ................. | 523/115 |
| 5,385,988 A | 1/1995 | Yamamoto et al. | |
| 8,349,934 B2 | 1/2013 | Murofushi et al. | |
| 8,455,564 B2 | 6/2013 | Kuboe et al. | |
| 2010/0105802 A1* | 4/2010 | Kuboe et al. ................. | 523/116 |
| 2011/0098411 A1 | 4/2011 | Yamaki et al. | |

FOREIGN PATENT DOCUMENTS

| | | |
|---|---|---|
| CN | 102076723 A | 5/2011 |
| CN | 102083403 A | 6/2011 |
| CN | 102245645 A | 11/2011 |
| JP | 03-070778 A | 3/1991 |
| JP | 10-077321 A | 3/1998 |
| JP | 10-231339 A | 9/1998 |
| JP | 10-298252 A | 11/1998 |
| JP | 2902525 B2 | 6/1999 |
| JP | 2007-153957 A | 6/2007 |
| JP | 4008246 B2 | 11/2007 |
| JP | 2009-286783 A | 12/2009 |

OTHER PUBLICATIONS

International Search Report of PCT/JP2013/052591 dated May 14, 2013 [PCT/ISA/210].

* cited by examiner

*Primary Examiner* — Robert S Loewe
(74) *Attorney, Agent, or Firm* — Sughrue Mion, PLLC

(57) ABSTRACT

A curable composition includes (A) silica fine particles surface-modified with at least one silane compound including at least (A1) a polymerizable silane compound of the general formula (1), (B) a (meth)acrylate compound, and (C) a polymerization initiator, $$SiR^1_a R^2_b R^3_c (OR^4)_{4-a-b-c} \qquad (1)$$

wherein $R^1$ is a C11-20 hydrocarbon group having an ethylenic unsaturated group, or a substituted C11-20 hydrocarbon group having an ethylenic unsaturated group and having an ether bond and/or an ester bond; $R^2$ is a hydrogen atom or a C1-4 hydrocarbon group; $R^3$ is a halogen atom; $R^4$ is a hydrogen atom or a C1-10 hydrocarbon group; a is an integer of 1 to 3; b is an integer of 0 to 2; c is an integer of 0 to 3; the sum of a and b is 1 to 3; the sum of a, b and c is 1 to 4.

11 Claims, No Drawings

CURABLE COMPOSITION AND USES THEREOF

CROSS REFERENCE TO RELATED APPLICATIONS

This is a National Stage of International Application No. PCT/JP2013/052591 filed Feb. 5, 2013 (claiming priority based on Japanese Patent Application No. 2012-027498 filed Feb. 10, 2012), the contents of which are incorporated herein by reference in their entirety.

TECHNICAL FIELD

The present invention relates to curable compositions and uses thereof. In more detail, the present invention relates to a curable composition, a cured product obtained by curing the composition, and an optical material/electronic material including the cured product.

BACKGROUND ART

Recent development in technology of optical industry including optical devices, optical communication and displays demands excellence in optical properties of materials. Examples of materials include optical materials and electronic materials such as optical lenses, optical disk substrates, substrates for liquid crystal display elements, substrates for color filters, substrates for organic EL (Electro Luminescence) display elements, substrates for solar cells, touch panels, optical elements, optical waveguides and sealing materials for LED (Light Emitting Diode).

In general, materials for forming substrates for liquid crystal display elements, substrates for color filters, substrates for organic EL display elements, substrates for solar cells and touch panels are often inorganic glass. However, many attempts have been made in recent years to replace glass plates with plastic materials, since glass plates are, for example, fragile, cannot be bended and are not suitable for weight reduction because of their large specific gravity. The optical materials such as substrates for liquid crystal display elements demand high transparency, too, since light passes through these materials.

As materials for forming optical lenses, optical elements, optical waveguides and LED sealing materials, recently, there has been demand for plastic materials with excellent heat resistance that deal with lead-free solders. For example, it is desired that the plastic materials have smaller volume change and lower coefficient of linear expansion upon being heated. In the application of the plastic materials instead of glass plates to optical parts and electronic parts such as optical lenses and optical waveguides, it is important that the shrinkage percent at the time of curing is low for their precise processing.

Conventional materials for forming optical materials are as follows. For example, Patent Literature 1 discloses a component prepared by curing a resin composition with an active energy ray, wherein the resin composition includes an amorphous thermoplastic resin and a bis(meth)acrylate curable with an active energy ray. Patent Literature 1 describes that instead of glass substrates, said component is preferably utilized for optical lenses, optical disk substrates and plastic substrates for liquid crystal displays. However, in Patent Literature 1, the shrinkage percent of said resin composition and the coefficient of linear expansion of said component are not studied; and the transparency of said component can be reduced because of the difference in refractive index between the amorphous thermoplastic resin and a resin obtained by curing the bis(meth)acrylate with an active energy ray.

Patent Literature 2 discloses a curable composition obtained by homogenously dispersing a silica-based condensation polymer in methyl methacrylate or in a bisphenol A-type ethylene oxide-modified (meth)acrylate, wherein the silica-based condensation polymer is prepared by the hydrolysis and condensation polymerization of a specific silane compound in a colloidal silica dispersion system. Furthermore, Patent Literature 2 describes that said composition can provide a cured product excellent in transparency and rigidity and that the cured product is useful in applications such as optical materials. However, in Patent Literature 2, the shrinkage percent of the curable composition and the coefficient of linear expansion of the cured product are not studied.

Generally known methods for reducing the shrinkage percent and the coefficient of linear expansion include a method adding an inorganic filler to a resin composition and a method laminating an inorganic film on a substrate. However, a resin composition containing the inorganic filler, after being cured, gives a cured product (substrate) that has significantly impaired transparency and has no surface smoothness and moreover is easily crackable as a result of the ununiformity caused in the substrate due to poor dispersibility of the inorganic filler.

Laminating an inorganic film on a substrate causes, for example, problems listed below. The problem (2) is caused, for example, by the large difference in terms of shrinkage at the time of curing between the inorganic film and a resin composition which after being cured serves as substrate.

(1) Poor adhesion between the inorganic film and the substrate.

(2) Peeling of the inorganic film from the substrate, or cracking of the substrate.

Patent Literature 3 describes a curable composition prepared by homogenously dispersing a silica-based condensation polymer in a (meth)acrylate, wherein the silica-based condensation polymer is obtained through the hydrolysis and condensation polymerization of a silane compound having a hydrocarbon residue having 1 to 10 carbon atoms in a colloidal silica dispersion, the curable composition being capable of giving a cured product with excellent transparency and rigidity. However, the viscosity and shrinkage percent of the cured product obtained from this curable composition are not studied.

Patent Literature 4 describes a curable composition obtained by homogenously dispersing a silica-based condensation polymer in a bisphenol A-type ethylene oxide-modified (meth)acrylate, wherein the silica-based condensation polymer is obtained through the hydrolysis and condensation polymerization of a specific silane compound in a colloidal silica dispersion system, the curable composition being capable of giving a cured product with excellent transparency and rigidity. In Patent Literature 4, the number of the carbons of an organic group having an ethylenic unsaturated group of the silane compound is limited to 10 or less, i.e., short chains. This makes the hydrophobicity of the colloidal silica insufficient, and blending of the colloidal silica in an amount exceeding 15 percent by weight would cause gelation. Thus, a sufficient amount of silica cannot be added, and the coefficient of linear expansion cannot be expected to be reduced.

Patent Literature 5 discloses a cured product obtained by crosslinking a composite composition obtained by removing an organic solvent in a composition which contains a bifunctional (meth)acrylate having a specific alicyclic structure and colloidal silica dispersed in an organic solvent. However, in the invention described in Patent Literature 5, the dispersibility of the silica in the composite composition and the inhibition of curing shrinkage are insufficient. This literature describes compensating for the dispersibility of the silica and adding a silane compound having an alicyclic structure to the composition in order to reduce the viscosity of the composite composition, but the hydrolysis of this silane compound is significantly slow. Thus, along with the failure to provide economical advantage in terms of production time, it is difficult for the effects compound to exhibit. In Patent Literature 5, there is a mention of coefficient of linear expansion, but the curing shrinkage is large.

CITATION LIST

Patent Literature

[Patent Literature 1] JP-A-1998-077321
[Patent Literature 2] JP-A-1998-298252
[Patent Literature 3] JP-B-2902525
[Patent Literature 4] JP-A-1998-231339
[Patent Literature 5] JP-B-4008246

SUMMARY OF THE INVENTION

Technical Problem

It is an object of the present invention to solve the problems associated with conventional art. That is, it is an object of the present invention to provide a curable composition with one or more properties improved as compared with conventional curable compositions, the improved properties being selected from transparency and heat resistance of a cured product formed from the composition and storage stability, handling property and moldability of the composition.

Technical Solution

The inventors extensively studied to achieve the above-described object, and has found that the above problems are solved by a curable composition having configurations described below, thereby perfecting the present invention.

That is, the present invention concerns, for example, [1] to [13] described below.

[1] A curable composition including:
(A) silica fine particles surface-modified with at least one silane compound that includes at least (A1) a polymerizable silane compound represented by the following general formula (1),
(B) a (meth)acrylate compound, and
(C) a polymerization initiator.

In the formula (1), $R^1$ is a hydrocarbon group having 11 to 20 carbon atoms that has an ethylenic unsaturated group, or a substituted hydrocarbon group having 11 to 20 carbon atoms that has an ethylenic unsaturated group and has an ether bond and/or an ester bond; $R^2$ is a hydrogen atom or a hydrocarbon group having 1 to 4 carbon atoms; $R^3$ is a halogen atom; $R^4$ is a hydrogen atom or a hydrocarbon group having 1 to 10 carbon atoms; a is an integer of 1 to 3; b is an integer of 0 to 2; c is an integer of 0 to 3; the sum of a and b is 1 to 3; the sum of a, b and c is 1 to 4; when a is 2 or more, multiple $R^1$ may be the same or different from each other; when b is 2, multiple $R^2$ may be the same or different from each other; when c is 2 or more, multiple $R^3$ may be the same or different from each other; and when the sum of a, b and c is 1 or 2, multiple $R^4$ may be the same or different from each other.

[2] The curable composition according to [1], wherein the (meth)acrylate compound (B) includes at least one kind selected from (B1) (meth)acrylate compounds having at least one (meth)acryloyloxy group and having no cyclic structures and (B2) (meth)acrylate compounds having at least one (meth)acryloyloxy group and having an alicyclic structure.

[3] The curable composition according to [1] or [2], wherein the polymerizable silane compound (A1) is (A1') a polymerizable silane compound represented by the following general formula (1').

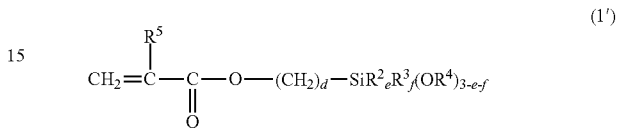

In the formula (1'), $R^2$ to $R^4$ are each synonymous with the same symbol in the formula (1); $R^5$ is a hydrogen atom or methyl group; d is an integer of 8 to 16; e is an integer of 0 to 2; f is an integer of 0 to 3; the sum of e and f is 0 to 3; when e is 2, multiple $R^2$ may be the same or different from each other; when f is 2 or more, multiple $R^3$ may be the same or different from each other; and when the sum of e and f is 0 or 1, multiple $R^4$ may be the same or different from each other.

[4] The curable composition according to any one of [1] to [3], wherein the silica fine particles (A) are silica fine particles surface-modified with silane compounds that includes the polymerizable silane compound (A1) and a silane compound (A2) different from the polymerizable silane compound (A1).

[5] The curable composition according to any one of [1] to [4], wherein the silane compound used for surface-modification does not include (A2') a polymerizable silane compound represented by the following general formula (2').

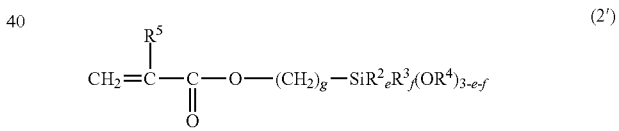

In the formula (2'), $R^2$ to $R^5$ and e, f are each synonymous with the same symbol in the formula (1'); when $R^5$ is a hydrogen atom, g is an integer of 1 to 7; and when $R^5$ is a methyl group, g is an integer of 1 to 6.

[6] The curable composition according to any one of [1] to [5], wherein the amount of the silica fine particles (A) in terms of silica fine particles before surface-modified is 1 to 90 parts by mass with respect to 100 parts by mass of the total amount of the silica fine particles (A) in terms of the silica fine particles before surface-modified and the (meth)acrylate compound (B).

[7] The curable composition according to any one of [1] to [6], wherein the silica fine particles (A) are silica fine particles surface-modified with 5 to 100 parts by mass of the silane compound with respect to 100 parts by mass of the silica fine particles before surface-modified.

[8] The curable composition according to any one of [1] to [7], wherein the amount of the polymerizable silane compound (A1) is 1 to 100% by mass with respect to the whole amount of the silane compound used for the surface-modification in the silica fine particles (A).

[9] The curable composition according to [2], wherein the (meth)acrylate compound (B1) has two or more (meth)acryloyloxy groups.

[10] The curable composition according to [2], wherein the (meth)acrylate compound (B2) has one to three (meth)acryloyloxy groups.

[11] A cured product obtainable by curing the curable composition according to any one of [1] to [10].

[12] An optical material including the cured product according to [11].

[13] An electronic material including the cured product according to [11].

Advantageous Effect of the Invention

The present invention can provide a curable composition with one or more properties improved as compared with conventional curable compositions, the improved properties being selected from transparency and heat resistance of a cured product formed from the composition and storage stability, handling property and moldability of the composition. For example, as compared with conventional curable compositions, a curable composition according to the present invention gives a cured product having a larger light transmittance and a lower coefficient of linear expansion, and does not gelate at the time of its preparation and storage, and has lower viscosity and lower shrinkage percent at the time of its curing.

EMBODIMENTS OF THE INVENTION

Hereinafter, embodiments of the present invention including a curable composition, a cured product obtained by curing the composition (hereinafter, also simply referred to as the "cured product") and a production process thereof, as well as an optical material and an electronic material that include the cured product are described in detail. The range of the present invention shall not be construed to be limited to specific embodiments described hereinafter.

[Curable Composition]

The curable composition of the present invention includes: (A) silica fine particles surface-modified with at least one silane compound that includes at least (A1) a polymerizable silane compound represented by the general formula (1), (B) a (meth)acrylate compound, and (C) a polymerization initiator. Hereinafter, these components are referred to also as the "component (A)", the "component (B)" and the "component (C)", respectively, and (A) the silica fine particles surface-modified with the silane compound are also referred to as "surface-modified silica fine particles". The term "polymerizable" used for the polymerizable silane compound refers to a polymerization based on the reaction of carbon-carbon double bond.

In the specification of the present invention, when silica fine particles to be surface-modified are those dispersed in an organic solvent, "100 parts by mass of silica fine particles before surface-modified" refers to the mass of the "silica fine particles alone which are dispersed in the organic solvent" (i.e., the mass of the organic solvent is excluded).

In the specification of the present invention, "(meth)acrylate compound" means an acrylate compound and/or a methacrylate compound. Hereinafter, other (meth)acrylate compounds are understood in this way, too. Likewise, "a (meth) acryloyloxy group" means an acryloyloxy group and/or a methacryloyloxy group.

The curable composition of the present invention, because of containing the silica fine particles (A) surface-modified with a specific silane compound, has low viscosity when being a composition and is excellent in handling property. The polymerizable silane compound (A1) bonded to the silica fine particles by surface-modification (involving the change in chemical structure) is reacted with the (meth)acrylate compound (B) (preferably, the (meth)acrylate compound (B1) or the (meth)acrylate compound (B2) described later), and thereby the dispersion stability of the silica fine particles (A) in the curable composition is improved.

In the present invention, the (meth)acrylate compound (B) and the silica fine particles (A) surface-modified with the specific silane compound are used together with the polymerization initiator (C), whereby the curable composition of the present invention is solidly cured through polymerization reaction, which can give a cured product with excellent heat resistance (as its index, low coefficient of linear expansion) and transparency comparable to or superior to conventional cured products (as its index, large light transmittance). At the time of curing, the presence of the silica fine particles (A) surface-modified with the specific silane compound inhibits the curing shrinkage of the composition, consequently suppressing the warpage of the cured product (curd film formed on a substrate, in most cases) so that the cured product can be prevented from being brittle or having cracks.

Hereinafter, each component of the curable composition of the present invention is described.

<Silica Fine Particles (A)>

The silica fine particles (A) are surface-modified silica fine particles obtained by surface-modifying silica fine particles with at least one silane compound that contains at least the polymerizable silane compound (A1).

<<Silica Fine Particles to be Surface-Modified with Silane Compound>>

As silica fine particles to be surface-modified with the silane compound, conventionally known silica fine particles can be used. Porous silica sol, or a composite metal oxide formed by silicon and e.g., aluminum, magnesium or zinc may be used.

The silica fine particles described above are not particularly limited in terms of their particle diameter, but particles having an average particle diameter of 1 to 1000 nm are preferable. In terms of the transparency of the cured product, the average particle diameter is further preferably 1 to 500 nm, most preferably 1 to 100 nm. In order to increase the incorporation amount of the silica fine particles into the cured product of the present invention, a mixture of silica fine particles differing in average particle diameter may be used.

The average particle diameter of the silica fine particles (those before surface-modified) is determined by the following method. Silica fine particles are observed by using a high-resolution transmission electron microscope (H-9000 manufactured by Hitachi, Ltd.). From the observed fine particle images, given 100 silica particle images are selected and are subjected to a known statistical method for image processing. Thereby, a number average particle diameter, defined as an average particle diameter, of the silica fine particles is obtained. The preferred range of the average particle diameter of the silica fine particles (those before surface-modified) is usually the preferred range of the average particle diameter of the silica fine particles (A) (those after surface-modified).

<<Silane Compound Used for Surface-Modification of Silica Fine Particles>>

The silica fine particles (A) are surface-modified silica fine particles obtained by surface-modifying the silica fine particles with at least one silane compound that contains at least the polymerizable silane compound (A1). The polymerizable silane compound (A1) is used to improve the dispersion stability of the silica fine particles in the curable composition.

That is, by surface-modifying the silica fine particles with the polymerizable silane compound (A1), the dispersion stability of the silica fine particles can be improved. By contrast, using only silica fine particles not surface-modified is not preferable, causing the curable composition to have significantly high viscosity and gelate.

As the silane compound, at least the polymerizable silane compound (A1) is used. In terms of reducing shrinkage percent at the time of curing the curable composition, a silane compound (A2) described later may be used in addition to the polymerizable silane compound (A1).

<Silane Compound (A1)>

The polymerizable silane compound (A1) is represented by the general formula (1).

$$SiR^1_a R^2_b R^3_c (OR^4)_{4-a-b-c} \quad (1)$$

In the formula (1), the meaning of each symbol is as follows:

$R^1$ is a hydrocarbon group having 11 to 20 carbon atoms that has an ethylenic unsaturated group or a substituted hydrocarbon group having 11 to 20 carbon atoms. Here, the substituted hydrocarbon group has an ethylenic unsaturated group, and has an ether bond and/or an ester bond. An example of the substituted hydrocarbon group is a (meth)acryloyloxyalkyl group.

If the substituted hydrocarbon group has an ester bond and an ethylenic unsaturated group, the number of carbons of the substituted hydrocarbon group is the total number of carbons including the number of carbons of the ester bond and the ethylenic unsaturated group.

$R^1$ is preferably a substituted hydrocarbon group having 11 to 20 carbon atoms that has an ethylenic unsaturated group, more preferably a substituted hydrocarbon group having 11 to 20 carbon atoms that has a (meth)acryloyloxy group.

In the present invention, by using the specific polymerizable silane compound (A1) having a long carbon-based chain ($R^1$) in the surface-modification of silica fine particles, the viscosity of the curable composition can be reduced. It is not preferred to use only silane compounds wherein $R^1$ is a (substituted) hydrocarbon group having 10 or less carbon atoms (example: 3-methacryloyloxypropyltrimethoxysilane) in the surface-modification of silica fine particles, since this would significantly increase the viscosity of the curable composition and cause the gelation of the composition.

$R^2$ is a hydrogen atom or a hydrocarbon group having 1 to 4 carbon atoms (example: an alkyl group).

$R^3$ is a halogen atom (example: a fluorine atom, a chlorine atom, a bromine atom).

$R^4$ is a hydrogen atom or a hydrocarbon group having 1 to 10 carbon atoms (example: an alkyl group).

a is an integer of 1 to 3, preferably 1; b is an integer of 0 to 2, preferably 0; c is an integer of 0 to 3, preferably 0; the sum of a and b is 1 to 3; and the sum of a, b and c is 1 to 4, preferably an integer of 1 to 3.

When a is 2 or more, multiple $R^1$ may be the same or different from each other; when b is 2, multiple $R^2$ may be the same or different from each other; when c is 2 or more, multiple $R^3$ may be the same or different from each other; and when the sum of a, b and c is 1 or 2, multiple $R^4$ may be the same or different from each other.

The polymerizable silane compound (A1) is preferably (A1') a polymerizable silane compound represented by the general formula (1') (silane compound having a (meth)acryloyloxy group), in terms of the transparency of the curable composition of the present invention.

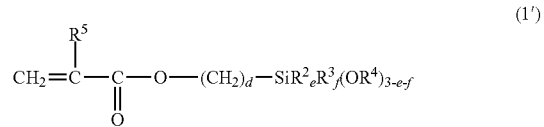

In the formula (1'), the meaning of each symbol is as follows:

$R^2$ is a hydrogen atom or a hydrocarbon group having 1 to 4 carbon atoms (example: an alkyl group), preferably a methyl group or an ethyl group from the viewpoint of the storage stability and the handling property of silane compounds; particularly preferably a methyl group from the viewpoint of the easiness of the synthesis of silane compounds.

$R^3$ is a halogen atom (example: a fluorine atom, a chlorine atom, a bromine atom), preferably a chlorine atom from the viewpoint of the storage stability and the handling property of silane compounds.

$R^4$ is a hydrogen atom or a hydrocarbon group having 1 to 10 carbon atoms (example: an alkyl group). From the viewpoint of the storage stability and the handling property of silane compounds as well as the easiness of the synthesis of silane compounds, $R^4$ is preferably a methyl group or an ethyl group.

$R^5$ is a hydrogen atom or a methyl group.

d is an integer of 8 to 16, preferably an integer of 8 to 10; e is an integer of 0 to 2, preferably 0; f is an integer of 0 to 3, preferably 0; and the sum of e and f is an integer of 0 to 3, preferably an integer of 0 to 2. From the viewpoint of the easiness of the synthesis of silane compounds, it is preferred that d is an integer of 8 to 10, e is an integer of 0 to 2 and f is 0; and it is particularly preferred that d is an integer of 8 to 10, e is 0, and f is 0.

When e is 2, multiple $R^2$ may be the same or different from each other; when f is 2 or more, multiple $R^3$ may be the same or different from each other: and when the sum of e and f is 0 or 1, multiple $R^4$ may be the same or different from each other.

Examples of the polymerizable silane compounds (A1) and (A1') include 8-acryloyloxyoctyldimethylmethoxysilane, 8-acryloyloxyoctylmethyldimethoxysilane, 8-acryloyloxyoctyldiethylmethoxysilane, 8-acryloyloxyoctylethyldimethoxysilane, 8-acryloyloxyoctyltrimethoxysilane, 8-acryloyloxyoctyldimethylethoxysilane, 8-acryloyloxyoctylmethyldiethoxysilane, 8-acryloyloxyoctyldiethylethoxysilane, 8-acryloyloxyoctylethyldiethoxysilane, 8-acryloyloxyoctyltriethoxysilane, 8-methacryloyloxyoctyldimethylmethoxysilane, 8-methacryloyloxyoctylmethyldimethoxysilane, 8-methacryloyloxyoctyldiethylmethoxysilane, 8-methacryloyloxyoctylethyldimethoxysilane, 8-methacryloyloxyoctyltrimethoxysilane, 8-methacryloyloxyoctyldimethylethoxysilane, 8-methacryloyloxyoctylmethyldiethoxysilane, 8-methacryloyloxyoctyldiethylethoxysilane, 8-methacryloyloxyoctylethyldiethoxysilane, 8-methacryloyloxyoctyltriethoxysilane, 10-acryloyloxydecyltrimethoxysilane, 10-methacryloyloxydecyltrimethoxysilane, 10-acryloyloxydecyltriethoxysilane, 10-methacryloyloxydecyltriethoxysilane, 12-acryloyloxydodecyltrimethoxysilane, 12-methacryloyloxydodecyltrimethoxysilane, 12-acryloyloxydodecyltriethoxysilane, and 12-methacryloyloxydodecyltriethoxysilane.

Of these, from the viewpoint of reducing the viscosity and improving the storage stability of the curable composition of the present invention, 8-methacryloyloxyoctyltrimethoxysilane and 8-methacryloyloxyoctyltriethoxysilane are preferable.

The polymerizable silane compounds (A1) may be used singly, or two or more kinds thereof may be used in combination.

The polymerizable silane compound (A1) can be produced by a publicly known method, and is also commercially available.

<Silane Compound (A2)>

In the present invention, as needed (for example, from the viewpoint of reducing the shrinkage percent at the time of curing the curable composition), at least one silane compound (A2) (other than the polymerizable silane compound (A1)) may be used in addition to the polymerizable silane compound (A1).

The silane compound (A2) is not particularly limited. For example, there can be mentioned silane compounds having any of an alkoxy group, a halogen atom, an alkyl group, a halogenated alkyl group, a phenyl group, a vinyl group, a styryl group, a (meth)acryloyloxy group, an epoxy group, a thiol group, an amino group and the like.

Examples of the silane compound (A2) include tetraethoxysilane, tetramethoxysilane, methyltrimethoxysilane, ethyltrimethoxysilane, dimethyldimethoxysilane, trimethylmethoxysilane, trimethylchlorosilane, phenyltrimethoxysilane, phenylmethyldimethoxysilane, diphenyldimethoxysilane, vinyltrimethoxysilane, styryltrimethoxysilane, 3-methacryloxypropylmethyldimethoxysilane, 3-methacryloxypropyltrimethoxysilane, 3-methacryloxypropyltriethoxysilane, β-(3,4-epoxycyclohexyl)ethyl trimethoxysilane, 3-glycidoxypropyltrimethoxysilane, 3-glycidoxypropylmethyldiethoxysilane, amino propyltrimethoxysilane, mercaptopropyltrimethoxysilane, trifluoropropyltrimethoxysilane, trifluoropropyltriethoxysilane, 1H,1H,2H,2H-perfluorooctyltriethoxysilane and 1H,1H,2H,2H-perfluorooctyltrimethoxysilane.

From the viewpoint of preventing the viscosity increase and gelation of the curable composition, as the silane compound (A2), a polymerizable silane compound (A2') represented by the following general formula (2') need not be used.

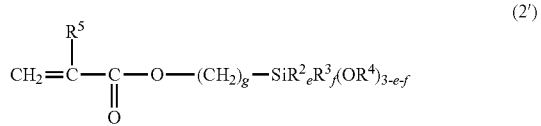

(2')

In the formula (2'), $R^2$ to $R^5$ and e, f are each synonymous with the same symbol in the formula (1'); when $R^5$ is a hydrogen atom, g is an integer of 1 to 7; and when $R^5$ is a methyl group, g is an integer of 1 to 6.

In terms of heat resistance of the cured product, the silane compounds (A2) that are preferred among the compounds described above are dimethyldimethoxysilane, trimethylmethoxysilane, trimethylchlorosilane, phenyltrimethoxysilane, phenylmethyldimethoxysilane, diphenyldimethoxysilane, trifluoropropyltrimethoxysilane, and trifluoropropyltriethoxysilane.

The silane compounds (A2) may be used singly, or two or more kinds thereof may be used in combination. The number of its type is not particularly limited, but from the viewpoint of simplification at the time of synthesis, preferred is the use of one to two types, and more preferred is the use of one type.

<<Amount of Silane Compound Used for Surface-Modification of Silica Fine Particles>>

In the silica fine particles (A) (surface-modified silica fine particles), at least one silane compound containing at least the polymerizable silane compound (A1) is used to surface-modify silica fine particles. Conditions for the surface-modification are detailed in <<Step 1>> of <Production Process of Curable Composition> described later.

The whole amount of the silane compound used for the surface-modification (for example, when the silane compound (A2) is used, the whole amount includes the amount of the silane compound (A2) and the amount of the polymerizable silane compound (A1)) is usually 5 to 100 parts by mass, preferably 20 to 50 parts by mass, most preferably 25 to 35 parts by mass, with respect to 100 parts by mass of silica fine particles before surface-modified (this amount is of silica alone, excluding the amount of solvents).

The silane compound amount less than the above range may increase the viscosity of the composition leading to deteriorated dispersibility of the silica fine particles (A) in the composition and gelation, or may reduce the heat resistance of the cured product obtained from the composition. If the silane compound amount exceeds the above range, the surface-modification of the silica fine particles may involve reaction among the silica fine particles leading to the aggregation or gelation of the silica fine particles (A) in the composition.

With respect to the whole amount of the silane compound used for the surface-modification, the amount of the polymerizable silane compound (A1) is usually 1 to 100% by mass, preferably 10 to 100% by mass, further preferably 20 to 100% by mass.

With respect to the whole amount of the silane compound used for the surface-modification, the amount of the polymerizable silane compound (A2') is preferably 5% by mass or less, more preferably 0% by mass, from the viewpoint of preventing the viscosity increase and gelation of the curable composition.

<<Content of Silica Fine Particles (A)>>

The silica fine particles (A) in the curable composition of the present invention are incorporated preferably in such a manner that based on 100 parts by mass of the total of the amount of the silica fine particles (A) in terms of the silica fine particles before surface-modified and the amount of the (meth)acrylate compound (B), the amount of the silica fine particles (A) in terms of the silica fine particles before surface-modified is 1 to 90 parts by mass, more preferably 15 to 65 parts by mass, most preferably 45 to 55 parts by mass.

The amount of the silica fine particles (A) "in terms of the silica fine particles before surface-modified" refers to, for example, the amount calculated based on x part by mass of silica fine particles, as in a curable composition containing z part by mass of the silica fine particles (A) obtained by surface-modifying x part by mass of silica fine particles with y part by mass of the silane compound.

When the content of the silica fine particles (A) is within the above range, the fluidity of the composition and the dispersibility of the silica fine particles (A) in the composition are satisfactory. Thus, using the composition of the present invention can provide a cured product with sufficient strength and heat resistance.

<(Meth)Acrylate Compound (B)>

The (meth)acrylate compound (B) has a (meth)acryloyloxy group.

Examples of the (meth)acrylate compound (B) include (B1) (meth)acrylate compounds having at least one (meth) acryloyloxy group and having no cyclic structures and (B2) (meth)acrylate compounds having at least one (meth)acryloyloxy group and having an alicyclic structure. Hereinafter, these are also simply referred to as the (meth)acrylate (B1) and the (meth)acrylate (B2), respectively.

The curable composition of the present invention preferably contains, as the (meth)acrylate compound (B), at least one of the (meth)acrylate (B1) and the (meth)acrylate (B2), and more preferably contains both the (meth)acrylate (B1) and the (meth)acrylate (B2).

In the curable composition of the present invention, the blending amount of the (meth)acrylate compound (B) is 10 to 99 parts by mass, more preferably 35 to 85 parts by mass, most preferably 45 to 55 parts by mass, with respect to 100 parts by mass of the total amount of the silica fine particles (A) in terms of silica fine particles before surface-modified and the (meth)acrylate compound (B).

<<(Meth)Acrylate (B1)>>

The (meth)acrylate (B1) is a (meth)acrylate compound having at least one (meth)acryloyloxy group and having no cyclic structures. The number of (meth)acryloyloxy group of the component (B1) is not particularly limited as long as being one or more, but is preferably two or more, more preferably two to six.

Examples of the (meth)acrylate (B1) include methoxypolyethylene glycol (meth)acrylate, 2-(meth)acryloyloxyethyl succinate, 2-hydroxy-3-(meth)acryloyloxypropyl methacrylate, polyethylene glycol di(meth)acrylate, polypropylene glycol di(meth)acrylate, 1,10-decanediol di(meth)acrylate, 1,6-hexanediol di(meth)acrylate, dipropylene glycol di(meth)acrylate, glycerol di(meth)methacrylate, trimethylolpropane tri(meth)acrylate, pentaerythritol tri(meth)acrylate, pentaerythritol tetra(meth)acrylate, dipentaerythritol tetra(meth)acrylate, dipentaerythritol penta(meth)acrylate, dipentaerythritol hexa(meth)acrylate, trimethylolpropanetrioxyethyl (meth)acrylate, ditrimethylolpropane tetra(meth)acrylate, ethoxylated pentaerythritol tetra(meth)acrylate, pentaerythritol tetra(meth)acrylate, and dipentaerythritol hexa(meth)acrylate.

The (meth)acrylates (B1) may be used singly, or two or more kinds thereof may be used in combination.

<<(Meth)Acrylate (B2)>>

The (meth)acrylate (B2) is a (meth)acrylate compound having at least one (meth)acryloyloxy group and having an alicyclic structure. The alicyclic structure is a structure where carbon atoms are bonded in a cyclic form that excludes aromatic ring structures. The number of (meth)acryloyloxy group in the component (B2) is not particularly limited as long as being one or more, but is preferably one to five, more preferably one to three.

The examples of the alicyclic structure of the component (B2), which is not particularly limited, preferably include, as its fundamental skeleton, a cyclopentane structure, a cyclohexane structure, a cyclodecane structure, an isobornyl structure, an adamantane structure, a structure formed by connecting any of these structures, or a structure having at least one structure formed by adding a double bond to any of these structures; more preferably include a cyclohexane structure, a cyclopentane structure, a dicyclopentane structure, a cyclodecane structure, a tricyclodecane structure, an adamantane structure, or a structure having at least one structure formed by adding a double bond to any of these structures; and still more preferably include a structure having at least one tricyclodecane structure or adamantane structure.

Examples of the (meth)acrylate (B2) include:

monofunctional (meth)acrylates such as cyclohexanedimethanol mono(meth)acrylate, 4-butylcyclohexyl (meth)acrylate, dicyclopentanyl (meth)acrylate, dicyclopentenyl (meth)acrylate, dicyclopentadienyl (meth)acrylate, bornyl (meth)acrylate, isobornyl (meth)acrylate, tricyclodecanyl (meth)acrylate, tricyclodecanedimethanol mono(meth)acrylate and adamantly (meth)acrylate; and polyfunctional (meth)acrylates such as cyclohexanedimethanol di(meth)acrylate, dicyclopentanyl di(meth)acrylate, dicyclopentenyl di(meth)acrylate, dicyclopentadienyl di(meth)acrylate, bornyl di(meth)acrylate, isobornyl di(meth)acrylate, tricyclodecanyl di(meth)acrylate, tricyclodecanedimethanol di(meth)acrylate, adamantyl di(meth)acrylate, adamantanedimethanol di(meth)acrylate, adamantanediethanol di(meth)acrylate, dimethyloldicyclopentane di(meth)acrylate, norbornanedimethylol di(meth)acrylate, cyclohexanetrimethanol tri(meth)acrylate, adamantyl tri(meth)acrylate, adamantanetrimethanol tri(meth)acrylate, norbornanetrimethylol tri(meth)acrylate, tricyclodecanetrimethanol tri(meth)acrylate, and perhydro-1,4,5,8-dimethanonaphthalene-2,3,7-(oxymethyl) tri(meth)acrylate.

Of these, monofunctional (meth)acrylates are preferable. In terms of the transparency and heat resistance of the cured product, dicyclopentadienyl (meth)acrylate, dicyclopentenyl (meth)acrylate and adamantyl (meth)acrylate are more preferable.

The (meth)acrylates (B2) may be used singly, or two or more kinds thereof may be used in combination.

The (meth)acrylate compound (B) may contain either (B1) or (B2), but preferably contains both (B1) and (B2).

When the (meth)acrylate compound (B) contains both (B1) and (B2), the mass ratio is preferably (B1):(B2)=1:99 to 99:1, more preferably 40:60 to 90:10, most preferably 40:60 to 60:40.

<Polymerization Initiator (C)>

Examples of the polymerization initiator (C) include photopolymerization initiators and thermal polymerization initiators that generate radicals. These compounds contribute to the curability of the curable composition of the present invention.

Examples of the photopolymerization initiators include benzophenone, benzoin methyl ether, benzoin propyl ether, diethoxyacetophenone, 1-hydroxy-cyclohexyl-phenyl-ketone, 2,6-dimethylbenzoyldiphenylphosphine oxide, 2,4,6-trimethylbenzoyldiphenylphosphine oxide and bis(2,4,6-trimethylbenzoyl)-phenylphosphine oxide. For these photopolymerization initiators, one kind of these may be used alone or two or more kinds of these may be used in combination.

The content of the photopolymerization initiators in the curable composition of the present invention is such an amount as to moderately cure the composition. The content of the photopolymerization initiators is usually 0.01 to 15 parts by mass, preferably 0.02 to 10 parts by mass, more preferably 0.1 to 5 parts by mass, with respect to 100 parts by mass of the composition excluding the photopolymerization initiators. If the content of the photopolymerization initiators is too high, the storage stability of the composition may be reduced, the composition may be colored, or a crosslinking reaction may proceed rapidly in the course of crosslinking to obtain the cured product so that problems such as cracking may occur at the time of curing. If the content of the photopolymerization initiators is too low, the composition may not be sufficiently cured.

Examples of the thermal polymerization initiators include benzoyl peroxide, diisopropyl peroxycarbonate, t-butyl peroxy(2-ethylhexanoate), t-butyl peroxyneodecanoate, t-hexyl peroxypivalate, 1,1,3,3-tetramethylbutyl peroxy-2-ethylhexanoate, t-butyl peroxypivalate, t-butyl peroxy-2-ethylhexanoate, t-hexyl peroxy isopropyl monocarbonate, dilauroyl peroxide, diisopropyl peroxydicarbonate, di(4-t-butylcyclohexyl)peroxydicarbonate and 2,2-di(4,4-di(t-butylperoxy)cyclohexyl)propane.

These thermal polymerization initiators may be used singly, or two or more kinds thereof may be used in combination.

The content of the thermal polymerization initiators in the curable composition of the present invention is such an amount as to moderately cure the composition. The content of the thermal polymerization initiators is usually 0.01 to 15 parts by mass, preferably 0.02 to 10 parts by mass, more preferably 0.1 to 5 parts by mass, with respect to 100 parts by mass of the composition excluding the thermal polymerization initiators. If the content of the thermal polymerization initiators is too high, the storage stability of the composition may be reduced, the composition may be colored, or a crosslinking reaction may proceed rapidly in the course of crosslinking to obtain the cured product so that problems such as cracking may occur at the time of curing. If the content of the thermal polymerization initiators is too low, the composition may not be sufficiently cured.

<Other Component>

The curable composition of the present invention may contain, in addition to the essential components (A) to (C), optional components including polymerization inhibitors, leveling agents, antioxidants, ultraviolet absorbing agents, infrared absorbing agents, light stabilizers, pigments, fillers such as other inorganic fillers, reactive diluents and other modifiers, in a range that is not detrimental to properties such as the viscosity of the composition and the transparency and heat resistance of the cured product.

Preferably, the curable composition of the present invention contains neither organic solvents nor water substantially. As used herein, "substantially" means that when the cured product is actually obtained from the curable composition of the present invention, the composition is not required to undergo another desolventing step; and it specifically means that the amount of the organic solvents and the amount of water remaining in the curable composition are each preferably not more than 1% by mass, more preferably not more than 0.5% by mass.

<<Polymerization Inhibitor>>

The polymerization inhibitors are used to prevent the components of the curable composition from causing polymerization reaction during storage. Examples of the polymerization inhibitors include hydroquinone, hydroquinone monomethyl ether, benzoquinone, p-t-butylcatechol and 2,6-di-t-butyl-4-methylphenol.

In terms of the transparency of the composition and the heat resistance of the cured product, the content of the polymerization inhibitor is preferably 0.1 part by mass or less with respect to 100 parts by mass of the curable composition excluding the polymerization inhibitor. The polymerization inhibitors may be used singly, or two or more kinds thereof may be used in combination.

<<Leveling Agent>>

Examples of the leveling agents include polyether-modified dimethylpolysiloxane copolymer, polyester-modified dimethylpolysiloxane copolymer, polyether-modified methylalkylpolysiloxane copolymer, aralkyl-modified methylalkylpolysiloxane copolymer and polyether-modified methylalkylpolysiloxane copolymer. For the leveling agents, one kind of these may be used alone or two or more kinds of these may be used in combination.

<<Antioxidant>>

The antioxidants are compounds serving as capturing oxidation-promoting factors such as free radical. The antioxidants are not particularly limited as long as being antioxidants generally used on an industrial basis, with examples thereof including phenol-based antioxidants, phosphorus-based antioxidants and sulfur-based antioxidants.

Examples of the phenol-based antioxidants include IRGANOX 1010 (pentaerythritol tetrakis[3-(3,5-di-t-butyl-4-hydroxyphenyl)propionate], manufactured by BASF Japan Ltd.), IRGANOX 1076 (octadecyl-3-(3,5-di-t-butyl-4-hydroxyphenyl)propionate, manufactured by BASF Japan Ltd.), IRGANOX 1330 (3,3',3'',5,5',5''-hexa-t-butyl-a,a',a''-(mesitylene-2,4,6-triyl)tri-p-cresol, manufactured by BASF Japan Ltd.), IRGANOX 3114 (1,3,5-tris(3,5-di-t-butyl-4-hydroxybenzyl)-1,3,5-triazine-2,4,6(1H,3H,5H)-trione, manufactured by BASF Japan Ltd.), IRGANOX 3790 (1,3,5-tris((4-t-butyl-3-hydroxy-2,6-xylyl)methyl)-1,3,5-triazine-2,4,6(1H,3H,5H)-trione, manufactured by BASF Japan Ltd.), IRGANOX 1035 (thiodiethylene bis[3-(3,5-di-t-butyl-4-hydroxyphenyl)propionate], manufactured by BASF Japan Ltd.), IRGANOX 1135 (benzenepropanoic acid, 3,5-bis(1,1-dimethylethyl)-4-hydroxy, C7-C9 branched alkyl esters, manufactured by BASF Japan Ltd.), Irganox 1520 L (4,6-bis(octylthiomethyl)-o-cresol, manufactured by BASF Japan Ltd.), IRGANOX 3125 (manufactured by BASF Japan Ltd.), IRGANOX 565 (2,4-bis(n-ocrylthio)-6-(4-hydroxy-3',5'-di-t-butylanilino)-1,3,5-triazine, manufactured by BASF Japan Ltd.), ADK Stab AO-80 (3,9-bis(2-(3-(3-t-butyl-4-hydroxy-5-methylphenyl)propionyloxy)-1,1-dimethylethyl)-2,4,8,10-tetraoxaspiro(5,5)undecane, manufactured by ADEKA Corporation), Sumilizer BHT (manufactured by Sumitomo Chemical Co., Ltd.), Sumilizer GA-80 (manufactured by Sumitomo Chemical Co., Ltd.), Sumilizer GS (manufactured by Sumitomo Chemical Co., Ltd.), Cyanox 1790 (manufactured by Cytec Industries Inc.) and vitamin E (manufactured by Eisai Co., Ltd.).

Examples of the phosphorus-based antioxidants include IRGAFOS 168 (tris(2,4-di-t-butylphenyl)phosphite, manufactured by BASF Japan Ltd.), IRGAFOS 12 (tris[2-[[2,4,8,10-tetra-t-butyldibenzo[d,f][1,3,2]dioxaphosphin-6-yl]oxy]ethyl]amine, manufactured by BASF Japan Ltd.), IRGAFOS 38 (bis(2,4-bis(1,1-dimethylethyl)-6-methylphenyl)ethyl phosphite, manufactured by BASF Japan Ltd.), ADK Stab 329K (manufactured by ADEKA Corporation), ADK Stab PEP36 (manufactured by ADEKA Corporation), ADK Stab PEP-8 (manufactured by ADEKA Corporation), Sandstab P-EPQ (manufactured by Clariant International Ltd.), Weston 618 (manufactured by General Electric Company), Weston 619G (manufactured by General Electric Company), Ultranox 626 (manufactured by General Electric Company) and Sumilizer GP (6-[3-(3-t-butyl-4-hydroxy-5-methylphenyl)propoxy]-2,4,8,10-tetra-t-butyldibenz[d,f][1.3.2]dioxaphosphepin, manufactured by Sumitomo Chemical Co., Ltd.).

Examples of the sulfur-based antioxidants include dialkyl thiodipropionate compounds such as dilauryl thiodipropionate, dimyristyl thiodipropionate and distearyl thiodipropionate, and β-alkylmercaptopropionate compounds of polyol such as tetrakis[methylene(3-dodecylthio)propionate]methane.

The addition of antioxidants in a large amount may cause coloring or inhibit curing, and therefore the content of antioxidants is preferably 0.1 to 10 parts by mass with respect to 100 parts by mass of the curable composition excluding the antioxidants. The antioxidants may be used singly, or two or more kinds thereof may be used in combination.

<<Ultraviolet Absorbing Agent>>

The ultraviolet absorbing agents are generally compounds capable of absorbing ultraviolet rays at a wavelength of from about 200 to 380 nm and transforming them into energy such as heat and infrared rays to emit the energy.

The ultraviolet absorbing agents are not particularly limited so long as being ultraviolet absorbing agents commonly used in industry. Examples thereof that can be used in the present invention include benzotriazole-based ones, triazine-based ones, diphenylmethane-based ones, 2-cyanopropenoate-based ones, salicylate-based ones, anthranilate-based ones, cinnamic acid derivative-based ones, camphor derivative-based ones, resolcinol-based ones, oxalinide-based ones and coumarin derivative-based ones. For the ultraviolet absorbing agents, one kind of these may be used alone or two or more kinds of these may be used in combination.

Examples of the benzotriazole-based ultraviolet absorbing agents include 2,2-methylenebis[4-(1,1,3,3-tetramethylbutyl)-6[(2H-benzotriazol-2-yl)phenol]], 2-(2H-benzotriazol-2-yl)-4-(1,1,3,3-tetramethylbutyl)phenol and 2-[5-chloro (2H)-benzotriazol-2-yl]-4-methyl-6-(t-butyl)phenol.

Examples of the triazine-based ultraviolet absorbing agents include 2-(4,6-diphenyl-1,3,5-triazin-2-yl)-5-[(hexyl)oxy]-phenol, 2,4,6-tris-(diisobutyl 4'-amino-benzalmalonate)-s-triazine, 4,6-tris(2-hydroxy-4-octyloxyphenyl)-1,3,5-triazine, 2-(2-hydroxy-4-octyloxyphenyl)-4,6-bis(2,4-dimethylphenyl)-1,3,5-triazine, 2-(2,4-dihydroxyphenyl)-4,6-bis(2,4-dimethylphenyl)-1,3,5-triazine, 2,4-bis(2-hydroxy-4-propyloxyphenyl)-6-(2,4-dimethylphenyl)-1,3,5-triazine and 2-(2-hydroxy-4-dodecyloxyphenyl)-4,6-bis(2,4-dimethylphenyl)-1,3,5-triazine.

Examples of the diphenylmethane-based ultraviolet absorbing agents include diphenylmethanone, methyldiphenylmethanone, 4-hydroxy diphenylmethanone, 4-methoxy diphenylmethanone, 4-octoxy diphenylmethanone, 4-decyloxy diphenylmethanone, 4-dodecyloxy diphenylmethanone, 4-benzyloxy diphenylmethanone, 4,2',4'-trihydroxy diphenylmethanone, 2'-hydroxy-4,4'-dimethoxy diphenylmethanone, 4-(2-ethylhexyloxy)-2-hydroxy-diphenylmethanone and methyl o-benzoyl benzoate and benzoin ethyl ether.

Examples of the 2-cyanopropenoate-based ultraviolet absorbing agents include ethyl α-cyano-β,β-diphenylpropenoate and isooctyl α-cyano-β,β-diphenylpropenoate.

Examples of the salicylate-based ultraviolet absorbing agents include isocetyl salicylate, octyl salicylate, glycol salicylate and phenyl salicylate. Examples of the anthranilate-based ultraviolet absorbing agents include menthyl anthranilate.

Examples of the cinnamic acid derivative-based ultraviolet absorbing agents include ethylhexyl methoxycinnamate, isopropyl methoxycinnamate, isoamyl methoxycinnamate, diisopropyl methylcinnamate, glyceryl-ethylhexanoate dimethoxycinnamate, methyl-α-carbomethoxycinnamate and methyl-α-cyano-β-methyl-p-methoxycinnamate.

Examples of the camphor derivative-based ultraviolet absorbing agents include benzylidene camphor, benzylidene camphor sulfonic acid, camphor benzalkonium methosulfate, terephthalylidene dicamphor sulfonic acid and polyacrylamide methylbenzylidene camphor. Examples of the resolcinol-based ultraviolet absorbing agents include dibenzoyl resolcinol bis(4-t-butylbenzoylresolcinol).

Examples of the oxalinide-based ultraviolet absorbing agents include 4,4'-di-octyloxy oxanilide, 2,2'-diethoxyoxy oxanilide, 2,2'-di-octyloxy-5,5'-di-t-butyl oxanilide, 2,2'-didodecyloxy-5,5'-di-t-butyl oxanilide, 2-ethoxy-2'-ethyl oxanilide, N,N'-bis(3-dimethylaminopropyl) oxanilide and 2-ethoxy-5-t-butyl-2'-ethoxy oxanilide. Examples of the coumarin derivative-based ultraviolet absorbing agents include 7-hydroxycoumarin.

<<Infrared Absorbing Agent>>

Examples of the infrared absorbing agents include metal complex-based compounds. Specific examples thereof include phthalocyanine-based compounds, naphthalocyanine-based compounds and dithiol metal complex-based compounds.

<<Light Stabilizer>>

The light stabilizers are compounds which reduce autoxidative degradation by radicals generated through light energy thereby suppressing deterioration of cured products.

The light stabilizers are not particularly limited as long as being generally used on an industrial basis, with examples thereof including hindered amine-based compounds (hereinafter, also referred to as "HALSs"), benzophenone-based compounds and benzotriazole-based compounds. The examples of the light stabilizers include compounds having a (meth)acryloyloxy group. Part of the light stabilizers having a (meth)acryloyloxy group fall within the (meth)acrylate compound (B): these are regarded as the (meth)acrylate compound (B) and a light stabilizer.

Examples of the HALSs include high molecular weight HALSs wherein a plural number of piperidine rings are linked through a triazine skeleton, such as N,N',N'',N'''-tetrakis(4,6-bis(butyl(N-methyl-2,2,6,6-tetramethylpiperidin-4-yl)amino)triazin-2-yl)-4,7-diazadecane-1,10-diamine, a polycondensate of dibutylamine, 1,3,5-triazine and N,N'-bis(2,2,6,6-tetramethyl-4-piperidyl)butylamine, poly[{(1,1,3,3-tetramethylbutyl)amino-1,3,5-triazin-2,4-diyl}{(2,2,6,6-tetramethyl-4-piperidyl)imino}hexamethylene{(2,2,6,6-tetramethyl-4-piperidyl)imino}], a polycondensate of 1,6-hexanediamine-N,N'-bis(2,2,6,6-tetramethyl-4-piperidyl) and morphorine-2,4,6-trichloro-1,3,5-triazine, and poly[(6-morphorino-s-triazin-2,4-diyl)[(2,2,6,6,-tetramethyl-4-piperidyl)imino]-hexamethylene[(2,2,6,6-tetramethyl-4-piperidyl)imino]; high molecular weight HALSs wherein piperidine rings are linked through an ester bond, such as a polymer of dimethyl succinate and 4-hydroxy-2,2,6,6-tetramethyl-1-piperidine ethanol, and an esterification mixture of 1,2,3,4-butanetetracarboxylic acid, 1,2,2,6,6-pentamethyl-4-piperidinol and 3,9-bis(2-hydroxy-1,1-dimethylethyl)-2,4,8,10-tetraoxaspiro[5,5]undecane; and pentamethylpiperidinyl methacrylate.

The content of the light stabilizers, in terms of coloring properties, is preferably 0.1 to 10 parts by mass with respect to 100 parts by mass of the curable composition excluding the light stabilizers. The light stabilizers may be used singly, or two or more kinds thereof may be used in combination.

<<Filler and Pigment>>

Examples of the fillers and pigments include calcium carbonate, talc, mica, clay, aluminosilicates, Aerosil (registered trademark), graphite, carbon nanotube, barium sulfate, aluminum hydroxide, zirconium oxide, zinc stearate, zinc oxide, red iron oxide and azo pigments.

<Viscosity of Curable Composition>

The curable composition of the present invention usually has a viscosity at 25° C. of 50 to 20,000 mPa·s, preferably 100 to 8,000 mPa·s, as measured by using a B-type viscometer DV-III ULTRA (manufactured by BROOKFIELD).

The curable composition of the present invention even when containing no solvents has moderate viscosity and good handling property. This is attributed to that the silica fine particles (A) due to the aforementioned surface-modification of the silica fine particles have high reactivity and compatibility with respect to the (meth)acrylate compound (B), and have high dispersion stability in the (meth)acrylate compound (B).

<Production Process of Curable Composition>

The curable composition of the present invention can be produced, for example, by sequentially carrying out the following steps: a step of surface-modifying silica fine particles with the aforementioned silane compound to obtain the silica fine particles (A) (Step 1); a step of mixing the silica fine particles (A) obtained in Step 1 with the (meth)acrylate compound (B) and optionally with other components to obtain a mixture liquid (Step 2); a step of distilling off (hereinafter, also referred to as "desolventing") volatile contents from the mixture liquid obtained in Step 2 to obtain a mixture (Step 3); a step of adding and mixing the polymerization initiator (C) and optionally other components with the mixture obtained in the Step 3 to obtain the curable composition (Step 4).

<<Step 1>>

In Step 1, silica fine particles are surface-modified with at least one silane compound containing at least the polymerizable silane compound (A1). In the surface-modification, hydrolysis and condensation polymerization of the silane compound proceeds on the surface of the silica fine particles.

Preferred silica fine particles are, in terms of their dispersibility in the curable composition, a dispersion obtained by allowing silica fine particles to be dispersed in an organic solvent (colloidal silica). A preferred organic solvent is the one that dissolves organic components (example: the (meth) acrylate compound (B)) contained in the curable composition.

The content of the silica fine particles in the above dispersion is usually 1 to 60% by mass, preferably 10 to 50% by mass, further preferably 20 to 40% by mass in terms of their dispersibility in the curable composition.

Examples of the organic solvent include alcohol solvents, ketone solvents, ester solvents and glycol ether solvents. In terms of the easiness of the distilling-off of volatile contents in Step 3, preferred are organic solvents such as alcohol solvents e.g. methanol, ethanol, isopropyl alcohol, butyl alcohol and n-propyl alcohol; and ketone solvents e.g. methyl ethyl ketone and methyl isobutyl ketone.

The dispersion can be produced by a publicly known method, and is also commercially available. Other silica fine particles described above can be also produced by a publicly known method, and are also commercially available.

The surface-modification is carried out as follows. Silica fine particles (preferably, colloidal silica) are introduced into a reaction vessel, to which at least one silane compound containing at least the polymerizable silane compound (A1) is added with stirring, followed by stirring/mixing. Further, water and a catalyst necessary for conducting the hydrolysis of the silane compound are added to hydrolyze the silane compound with stirring, and thereby condensation polymerization is allowed to proceed on the surface of the silica fine particles.

During hydrolysis, the disappearance of the silane compound due to hydrolysis can be confirmed by gas chromatography. The measurement conditions are as described in Example.

As described in <Silica Fine Particles (A)>, at the time of surface-modifying the silica fine particles, the amount of the silane compound (for example, when the silane compound (A2) is used, the amount of the silane compound includes the amount of the polymerizable silane compound (A1) and the amount of the silane compound (A2)) is usually 5 to 100 parts by mass, preferably 20 to 50 parts by mass, most preferably 25 to 35 parts by mass with respect to 100 parts by mass of the silica fine particles before surface-modified.

The amount of water necessary to carry out hydrolysis is usually 0.1 to 10 mol equivalents, preferably 1 to 10 mol equivalents, more preferably 1 to 5 mol equivalents, with respect to 1 mol equivalent of the silane compound. If the amount of water is excessively small, the hydrolysis rate may be considerably slow, lacking economic efficiency, and surface-modification may not progress adequately. If the amount of water is excessively large, the silica fine particles (A) may form a gel.

In carrying out hydrolysis, a catalyst for hydrolysis reaction is generally used.

Examples of the catalyst for hydrolysis reaction include inorganic acids such as hydrochloric acid (aqueous solution of hydrogen chloride), acetic acid, sulfuric acid and phosphoric acid; organic acids such as formic acid, propionic acid, oxalic acid, para-toluenesulfonic acid, benzoic acid, phthalic acid and maleic acid; alkaline catalysts such as potassium hydroxide, sodium hydroxide, calcium hydroxide and ammonia; organometals; metal alkoxides; organotin compounds such as dibutyltin dilaurate, dibutyltin dioctyrate and dibutyltin diacetate; metal chelating compounds such as aluminum tris(acetylacetonate), titanium tetrakis(acetylacetonate), titanium bis(butoxy)bis(acetylacetonate), titanium bis(isopropoxy)bis(acetylacetonate), zirconium bis(butoxy)bis(acetylacetonate) and zirconium bis(isopropoxy)bis(acetylacetonate); and boron compounds such as boron butoxide and boric acid. Of these, in the light of solubility to water and sufficient hydrolysis rate being obtained, hydrochloric acid, acetic acid, maleic acid and boron compounds are preferred.

The catalysts for hydrolysis reaction may be used singly, or two or more kinds thereof may be used in combination.

When the hydrolysis of a single kind or plural kinds of the silane compounds is carried out in Step 1, a water-insoluble catalyst may be used, but a water-soluble catalyst is preferably used. In cases where a water-soluble catalyst for the hydrolysis reaction is used, it is preferred that the water-soluble catalyst is dissolved in an appropriate amount of water and then the resultant solution is added to a reaction system, in which case the catalyst can be dispersed uniformly.

The addition amount of the catalyst used for hydrolysis is not particularly limited. The catalyst can be used for hydrolysis reaction as an aqueous solution prepared by dissolving the catalyst in water; at this time, the addition amount of the catalyst is the amount of the catalyst (e.g., an acid or a base) alone contained in the aqueous solution.

The reaction temperature of the hydrolysis reaction is not particularly limited, and it is usually within the range from 10 to 80° C., preferably within the range from 20 to 50° C. If the reaction temperature is excessively low, the hydrolysis rate may be considerably low, lacking economic efficiency, and surface modification may not progress adequately. If the reaction temperature is excessively high, gelation reaction tends to easily occur.

The reaction time for carrying out hydrolysis reaction, which is not particularly limited, is usually 10 minutes to 48 hours, preferably 30 minutes to 24 hours.

In Step 1, the surface-modification using two or more kinds of silane compounds may be carried out sequentially, namely using one silane compound after another silane compound, but is preferably carried out under a single stage at the same time in terms of simplification of reaction process and efficiency.

<<Step 2>>

In Step 2, the method of mixing the silica fine particles (A) obtained in Step 1 with the (meth)acrylate compound (B) and optionally with other components is not particularly limited. Examples thereof include a method in which the respective components described above are mixed at room temperature or under heated conditions by using a blending machine such as a mixer, a ball-mill or a three-roll mill; and a method in which in the reaction vessel where Step 1 has been carried out, the (meth)acrylate compound (B) and optional other components are continuously added and mixed with stirring.

<<Step 3>>

In Step 3, for the distilling-off (desolventing) of volatile contents such as organic solvents and water from the mixture liquid composed of the silica fine particles (A) and the (meth)acrylate compound (B) and the like, it is preferred that the mixture liquid is heated under reduced pressure.

The temperature is maintained preferably at 20 to 100° C., and in the light of the balance between the prevention of aggregation/gelation and the solvent removal speed, more preferably at 30 to 70° C., still more preferably at 30 to 50° C. The temperature that is too high may result in the extremely low fluidity and in gelation of the curable composition.

The degree of vacuum when the pressure is reduced is usually 10 to 4,000 kPa, and in the light of the balance between the solvent removal speed and the prevention of aggregation/gelation, more preferably 10 to 1,000 kPa, most preferably 10 to 500 kPa. The degree of vacuum that is too high may result in the extremely slow solvent removal speed and uneconomical production.

Preferably, the mixture prepared after desolventing substantially contains no organic solvents and water. As used herein, "substantially" means that when a cured product is actually obtained from the curable composition of the present invention, the composition is not required to undergo another desolventing step; and it specifically means that the amount of organic solvents and the amount of water remaining in the curable composition are each preferably not more than 1% by mass, more preferably not more than 0.5% by mass.

In Step 3, a polymerization inhibitor may be added prior to desolventing such that the addition amount of the polymerization inhibitor is not more than 0.1 part by mass with respect to 100 parts by mass of the mixture prepared after desolventing. The polymerization inhibitor can be used to prevent the components of the composition from causing polymerization reaction during desolventing and during the storage of the curable composition prepared after desolventing.

Step 3 may be carried out after transferring the mixture liquid obtained in Step 2 composed of the silica fine particles (A), the (meth)acrylate compound (B) and the like to an apparatus specifically prepared for Step 3. Alternatively, if Step 2 has been carried out in the reaction vessel where Step 1 has been carried out, Step 3 may be carried out subsequently to Step 2 in the same reaction vessel.

<<Step 4>>

In Step 4, the method of adding the polymerization initiator (C) and optional other components to the mixture prepared after desolventing in Step 3 and mixing these components is not particularly limited. Examples thereof include a method in which the respective components described above are mixed at room temperature by using a blending machine such as a mixer, a ball-mill or a three-roll mill; and a method in which in the reaction vessel where Steps 1 to 3 have been carried out, the polymerization initiator (C) and optional other components are continuously added and mixed with stirring.

The curable composition obtained by adding and mixing the polymerization initiator (C) and the like may be filtrated as necessary. The filtration is carried out to remove foreign matters such as contaminants in the curable composition. The method of filtration is not particularly limited, and preferred is pressure filtration using a filter such as membrane-type filter, a cartridge-type filter or the like, the filter having a pressure filtration pore diameter of 1.0 µm.

In such a manner as described above, the curable composition of the present invention can be obtained.

[Cured Product]

By curing the curable composition of the present invention, a cured product is obtained.

In the cured product of the present invention, the silica fine particles (A) surface-modified with at least one kind of silane compound containing the polymerizable silane compound (A1), the (meth)acrylate compound (B) and the like are solidly cured, and therefore the cured product of the present invention is excellent in heat resistance (as its index, has lower coefficient of linear expansion), and has transparency equivalent or superior to the transparency in conventional art (as its index, larger light transmittance). Thus, the cured product can be used suitably for optical materials and electronic materials, as described later.

As compared with cured products resulting from curable compositions not containing the surface-modified silica fine particles (A) but containing the (meth)acrylate compound (B), the cured product of the present invention resulting from the curable composition including the silica fine particles (A) surface-modified with at least one kind of silane compound containing the polymerizable silane compound (A1) and the (meth)acrylate compound (B) has an average coefficient of linear expansion in the range of 35° C. to 250° C. that is lower preferably by 10 ppm or more, more preferably 20 ppm or more. The detail of how to measure the average coefficient of linear expansion is as described in Examples.

The curable composition of the present invention has shrinkage parcent at the time of its curing of preferably 15% or less, more preferably 10% or less, still more preferably 8% or less. How to define and measure the shrinkage percent is as described in Examples.

[Production Process for Cured Product]

A process for producing the cured product of the present invention includes a step of curing the curable composition of the present invention.

Examples of the curing method include a method in which ethylenically unsaturated groups are crosslinked with each other by irradiation with active energy ray; a method in which ethylenically unsaturated groups are thermally polymerized by heating; and combinations of these methods.

In cases where the curable composition is cured by being irradiated with active energy ray such as ultraviolet ray, a photopolymerization initiator is incorporated to the curable composition in Step 4. In cases where the curable composition is cured by heating, a thermal polymerization initiator is incorporated to the curable composition in Step 4.

The cured product of the present invention can be obtained by applying the curable composition of the present invention on a substrate such as a glass plate, a plastic plate, a metal plate or a silicon wafer to form a coating film, and then irradiating the coating film with an active energy ray or heating the coating film. For curing, both the application of an active energy ray and heating may be carried out.

Examples of the method of applying the curable composition include coating using a bar coater, an applicator, a die coater, a spin coater, a spray coater, a curtain coater, a roll coater or the like, and coating by screen printing and the like, and coating by dipping and the like.

The amount of the curable composition of the present invention to be applied on a substrate is not particularly limited, and can be appropriately adjusted depending on a purpose. The amount of the curable composition is preferably such an amount to allow a coating film obtained after curing treatment by application of an active energy ray and/or by heating to have a film thickness of from 1 µm to 10 mm, more preferably 10 to 1000 µm.

As the active energy ray used for curing, an electron ray, or light at a wavelength range from ultraviolet ray to infrared ray is preferred. A light source that can be used is, for example, an ultrahigh pressure mercury light source or a metal halide light source for ultraviolet ray, a metal halide light source or a halogen light source for visible ray, and a halogen light source for infrared ray. Other employable light sources include laser and LED.

The irradiation quantity of the active energy ray is appropriately determined depending on the kind of a light source, the film thickness of a coating film, and the like, and can be appropriately determined such that the reactivity of the (meth)acryloyloxy group of the (meth)acrylate (B) is not less than 80%, more preferably not less than 90%. The reactivity is calculated, based on infrared absorption spectra, from the change of absorption peak intensity of (meth)acryloyloxy group between before and after the reaction.

Furthermore, after the curing through the application of active energy ray, the curing may be progressed further by heating treatment (annealing treatment). At this time, the heating temperature is preferably within the range from 80 to 220° C., and the heating time is preferably within the range from 10 to 60 minutes.

In cases where the curable composition of the present invention is thermally polymerized by heating treatment for curing, the heating temperature is preferably within the range from 80 to 200° C., more preferably within the range from 100 to 160° C. If the heating temperature is lower than the above range, heating time may need to be prolonged, which tends to result in uneconomical production. The heating temperature higher than the above range may lead to higher energy cost and may take more heating-up time and more temperature-falling time, which tends to result in uneconomical production.

The heating time is appropriately determined depending on the heating temperature, the film thickness of a coating film and the like, and can be appropriately determined such that the reactivity of the (meth)acryloyloxy group of the (meth) acrylate (B) is not less than 80%, more preferably not less than 90%. The reactivity is calculated as described above, based on infrared absorption spectra, from the change of an absorption peak intensity of (meth)acryloyloxy group between before and after the reaction.

[Optical Material/Electronic Material]

The curable composition of the present invention can be preferably used as optical materials/electronic materials such as transparent plates, optical lenses, optical disk substrates, plastic substrates for liquid crystal display elements, substrates for color filters, plastic substrates for organic EL display elements, substrates for solar cells, touch panels, optical elements, optical waveguides and LED sealing materials.

EXAMPLES

Hereinafter, the present invention is further specifically described with reference to Examples, but the present invention is not limited by these Examples. In the descriptions provided below including Examples, "part(s)" means "part(s) by mass", unless otherwise noted.

Preparation of Curable Composition

Example 1

As silica fine particles to be surface-modified, an isopropyl alcohol dispersion-type colloidal silica (silica fine particles content: 30% by mass, average particle diameter: 10 to 20 nm, product name: SNOWTEX IPA-ST, manufactured by Nissan Chemical Industries, Ltd.) was used.

Into a separable flask, 100 g (this amount included the amount of a solvent) of the isopropyl alcohol dispersion-type colloidal silica was introduced. Into the separable flask, as the silane compound (A1), 9 g of 8-methacryloyloxyoctyltrimethoxysilane (MOS) (30 parts based on 100 parts of silica fine particles before surface-modified in the colloidal silica) was added, and stirred and mixed. Further, 2 g of hydrochloric acid having a concentration of 0.1825% by mass was added. The mixture was stirred at 25° C. for 24 hours, to surface-modify the silica fine particles. A dispersion containing surface-modified silica fine particles was obtained.

The disappearance of the silane compound (MOS in this example) due to hydrolysis was confirmed by gas chromatography (Model 6850; manufactured by Agilent Technologies Inc.). The measurement using internal standard method was carried out using a non-polar column DB-1 (manufactured by J&W Scientific) at a temperature from 50 to 300° C. at a heating rate of 10° C./min and using He as a carrier gas at a flow rate of 1.2 cc/min and using a hydrogen flame ionization detector. MOS disappeared 24 hours after the addition of the above-described hydrochloric acid.

To the dispersion containing the surface-modified silica fine particles, 15 g of trimethylolpropane triacrylate (TMPTA) as the (meth)acrylate (B1) (25 parts based on 50 parts of the silica fine particles in terms of ones before surface-modified in the dispersion), 15 g of adamantyl methacrylate (ADMA) as the (meth)acrylate (B2) (25 parts based on 50 parts of the silica fine particles in terms of ones before surface-modified in the dispersion), 0.09 g of IRGANOX 1135 as an antioxidant (IRGANOX 1135: benzenepropanoic acid, 3,5-bis(1,1-dimethylethyl)-4-hydroxy, C7-C9 side chain alkyl ester; manufactured by BASF Japan) (0.15 part based on 100 part by mass of the total of the silica fine particles in terms of ones before surface-modified in the dispersion, TMPTA and ADMA), and 0.09 g of pentamethylpiperidinyl methacrylate as HALS (product name: FA-711MM; manufactured by Hitachi Chemical Co., Ltd.) (0.15 part based on 100 parts by mass of the total of the silica fine particles in terms of ones before surface-modified in the dispersion, TMPTA and ADMA) were added, and homogenously mixed with one another. Thereafter, the mixture was heated under reduced pressure with stirring at 40° C. at 100 kPa to remove volatile contents. Thereby, a mother liquid was obtained.

To 100 parts of the resultant mother liquid, 1.0 part of perbutyl 0 (manufactured by NOF Corporation) as a thermal polymerization initiator was added, to obtain a curable composition (X-1). Results are shown in Table 1.

Example 2

Example 1 was repeated except that the silane compound was replaced with a mixture of 18 parts of 8-methacryloyloxyoctyltrimethoxysilane (MOS) and 12 parts of phenyltrimethoxysilane (PhS) with respect to 100 parts of the silica fine particles before surface-modified, to obtain a curable composition (X-2).

Example 3 to Example 7

Example 2 was repeated except that in Example 2, the amount of each component was changed as shown in Table 1, to obtain any of curable compositions (X-3) to (X-7).

Comparative Example 1

Example 1 was repeated except that in Example 1, the silica fine particles and the silane compound were not used, and the amount of the (meth)acrylate compound (B) was changed as shown in Table 2, to obtain a curable composition (Y-1). Unlike Example 1, in this comparative example, the composition contained no solvents derived from the colloidal silica dispersion. Thus, desolventing step was omitted.

Comparative Example 2

Example 1 was repeated except that in Example 1, the silica fine particles surface-modified with the silane compound were not used, and instead an unmodified isopropyl alcohol dispersion-type colloidal silica was used as it was, and that the amount of each component was changed as shown in Table 2, to obtain a curable composition (Y-2).

Examples 8 to 16 and Comparative Examples 3 to 32

Example 1 was repeated except that in Example 1, the type and the addition amount of the silica fine particles, the silane compound and the (meth)acrylate compound (B) were changed as shown in any of Tables 2 to 8, to obtain any of curable compositions (X-8) to (X-16) and (Y-3) to (Y-32).

In the tables, "photopolymerization" indicated in the section of "polymerization system" means that instead of the thermal polymerization initiator used in Example 1, 1-hydroxy-cyclohexyl-phenyl-ketone (product name: IRGACURE 184, BASF Japan) was added as a photopolymerization initiator in an amount of 0.5 part based on 100 parts of the mother liquid.

An example where the addition amount of silica fine particles is zero means a composition in which silica fine particles are not added as in Comparative Example 1. Thus, as in Comparative Example 1, desolventing step is omitted. An example where the addition amount of silane compound is zero means a composition in which unmodified colloidal silica is added as it is as in Comparative Example 2.

When the "polymerization system" section in the tables is blank, it is meant that a composition gelated prior to the addition of a polymerization initiator, which prevented conducting subsequent operations (addition of a polymerization initiator, curing and property evaluation).

<Production of Cured Film>

Each of the curable compositions (thermally curable systems which did not gelate): (X-1) to (X-7), (X-10) to (X-12), (Y-1), (Y-3), (Y-4), (Y-7), (Y-14), (Y-16), (Y-17), (Y-19) and (Y-20) was applied on a separate glass substrate such that the thickness of its cured film was about 500 to 550 μm or about 200 μm to form a coating film, and the coating film was heat-treated at 130° C. for 30 minutes, so that the coating film was cured.

Each of the curable compositions (photo curable systems which did not gelate) (X-8), (X-9), (X-13) to (X-16), (Y-8), (Y-12), (Y-13), (Y-23), (Y-26) and (Y-30) to (Y-32) was applied on a separate glass substrate such that the thickness of its cured film was about 500 to 550 μm or about 200 μm to form a coating film, and the coating film was exposed by using an exposure device equipped with an ultrahigh-pressure mercury lamp at an intensity of 5 J/cm$^2$, so that the coating film was cured.

<Property Measurement Method>

(1) Viscosity

The viscosity of each curable composition was measured by using a B-type viscometer DV-III ULTRA (manufactured by BROOKFIELD) at 25° C. A curable composition with moderately low viscosity is a composition excellent in handling property.

(2) Shrinkage Percent

Regarding curable compositions having a photopolymerization initiator added therein among the above curable compositions (those which did not gelate), their shrinkage was determined in the following manner. Each of the curable compositions was applied by spin coating on a separate silicon substrate (under such conditions as to allow its cured film to have a thickness of about 500 μm), and was cured under the same exposure conditions as indicated in <Production of Cured Film> under nitrogen atmosphere. The film thickness before curing and the film thickness after curing were measured with a film thickness measuring instrument (F20-NIR manufactured by Filmetrics), and its shrinkage percent was determined from the following equation. The lower the shrinkage percent is, the superior moldability the curable composition has.

Shrinkage percent (%)=(Film thickness before curing–Film thickness after curing)/Film thickness before curing×100(%)

Regarding curable compositions having a thermal polymerization initiator added therein among the above curable compositions (those which did not gelate), their shrinkage percent was determined from the following manner. A specific gravity of the curable composition before cured was measured with a density/specific gravity meter (DA-650; manufactured by Kyoto Electrics Manufacturing Co., Ltd.). A specific gravity of the curable composition after cured under the curing conditions described in <Production of Cured Film> was measured with an automatic specific gravidy meter (DMA-220H; manufactured by Shinko Denshi Co., Ltd.), and its shrinkage percent was determined from the following equation.

Shrinkage percent (%)=(Specific gravity after curing–Specific gravity before curing)/Specific gravity after curing×100(%)

(3) Coefficient of Linear Expansion

A coefficient of linear expansion of the cured film having a thickness of about 200 μm obtained in <Production of Cured Film> was measured in the following manner. The film was heated with a thermomechanical analyzer (TMA/SS6100, manufactured by SII Nanotechnology, Inc.) from 30° C. to 300° C. or to glass transition point at a rate of 5° C./min under nitrogen atmosphere, with a load of 20 mN applied to the film, to calculate an average coefficient of linear expansion in the range of from 35° C. to 250° C. or in the range of from 30° C. to a temperature not more than glass transition point. The lower the average coefficient of linear expansion is, the superior heat resistance the cured film has.

(4) Light Transmittance

A light transmittance (T %) at a wavelength of 400 nm of the cured film having a thickness of about 500 to 550 μm obtained in <Production of Cured Film> was measured by using a spectrophotometer (manufactured by JASCO Corporation, UV3600). The larger the light transmittance is, the superior transparency the cured film has.

Evaluation results of the foregoing are shown in Tables 1 to 8.

TABLE 1

|  |  |  | Example 1 | Example 2 | Example 3 | Example 4 | Example 5 | Example 6 | Example 7 |
|---|---|---|---|---|---|---|---|---|---|
| Composition of Curable Composition | | | X-1 | X-2 | X-3 | X-4 | X-5 | X-6 | X-7 |
| Silica Fine Particles (A) or Silica Fine Particles Whose Surfaces Have Not Been Modified | Silica Fine Particles | Silica Particle Diameter (nm) | 50 / 10 | 50 / 10 | 50 / 10 | 50 / 10 | 50 / 10 | 60 / 10 | 20 / 10 |
| | Silane Compound Used for Surface-modification of Silica Fine Particles | Silane Compound (A1) MOS | 30 | 18 | 6 | 30 | 12 | 18 | 18 |
| | | Silane Compound (A2) PhS / MPS / VTS | | 12 | 24 | 20 | 8 | 12 | 12 |
| (Meth)acrylate Compound (B) | (Meth)acrylate (B1) | TMPTA APG700 | 25 | 25 | 25 | 25 | 25 | 20 | 40 |
| | (Meth)acrylate (B2) | ADMA IRR214K | 25 | 25 | 25 | 25 | 25 | 20 | 40 |
| Polymerization Initiator (C) | Polymerization System | | Thermal curing | Thermal curing | Thermal curing | Thermal curing | Thermal curing | Thermal curing | Thermal curing |
| Properties of Curable Composition | | | | | | | | | |
| Viscosity at 25° C. (mPa·s) | | | 1360 | 1340 | 3950 | 1640 | 2170 | 18070 | 80 |
| Shrinkage Percent (%) | | | 5.32 | 4.84 | 5.04 | 5.11 | 5.07 | 4.12 | 6.60 |
| Average Coefficient of Linear Expansion (ppm) | | | 65.0 | 67.7 | 70.4 | 91.3 | 77.0 | 57.2 | 86.9 |
| Light Transmittance at 400 nm (%) | | | 90.8 | 88.9 | 90.4 | 90.6 | 89.7 | 89.3 | 89.4 |

TABLE 2

|  |  |  | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|
| Composition of Curable Composition | | | Y-1 | Y-2 | Y-3 | Y-4 | Y-5 | Y-6 | Y-7 |
| Silica Fine Particles (A) or Silica Fine Particles Whose Surfaces Have Not Been Modified | Silica Fine Particles | Silica Particle Diameter (nm) | | 40 / 10 | 50 / 10 | 50 / 10 | 50 / 10 | 60 / 10 | 20 / 10 |
| | Silane Compound Used for Surface-modification of Silica Fine Particles | Silane Compound (A1) MOS | | | | | | | |
| | | Silane Compound (A2) PhS / MPS / VTS | | | | 30 / 30 | 12 / 18 | 12 / 18 | 12 / 18 |
| (Meth)acrylate Compound (B) | (Meth)acrylate (B1) | TMPTA APG700 | 50 | 30 | 25 | 25 | 25 | 20 | 40 |
| | (Meth)acrylate (B2) | ADMA IRR214K | 50 | 30 | 25 | 25 | 25 | 20 | 40 |
| Polymerization Initiator (C) | Polymerization System | | Thermal curing | | Thermal curing | Thermal curing | | | Thermal curing |
| Properties of Curable Composition | | | | | | | | | |
| Viscosity at 25° C. (mPa·s) | | | 30 | Gelation during preparation of composition | 10860 | 5734 | Gelation during preparation of composition | Gelation during preparation of composition | 83 |
| Shrinkage Percent (%) | | | 8.44 | | 5.14 | 5.70 | | | 7.57 |
| Average Coefficient of Linear Expansion (ppm) | | | 87.2 | | 68.0 | 68.0 | | | 89.0 |
| Light Transmittance at 400 nm (%) | | | 89.1 | | 69.1 | 90.9 | | | 89.9 |

TABLE 3

|  |  |  | Example 8 | Example 9 | Comparative Example 8 | Comparative Example 9 |
|---|---|---|---|---|---|---|
| Composition of Curable Composition | | | X-8 | X-9 | Y-8 | Y-9 |
| Silica Fine Particles (A) or Silica Fine Particles Whose Surfaces Have Not Been Modified | Silica Fine Particles | Silica Particle Diameter (nm) | 40 / 10 | 40 / 10 | | 40 / 10 |
| | Silane Compound Used for Surface-modification of Silica Fine Particles | Silane Compound (A1) MOS | 18 | 18 | | |
| | | Silane Compound (A2) PhS / MPS / VTS | | | | 12 |

TABLE 3-continued

| | | | | | | |
|---|---|---|---|---|---|---|
| (Meth)acrylate Compound (B) | (Meth)acrylate (B1) | TMPTA APG700 | 30 | 30 | 50 | 30 |
| | (Meth)acrylate (B2) | ADMA IRR214K | 30 | 30 | 50 | 30 |
| Polymerization Initiator (C) | Polymerization System | | Photo curing | Photo curing | Photo curing | |
| Properties of Curable Composition | | | | | | |
| Viscosity at 25° C. (mPa · s) | | | 366 | 389 | 30 | Gelation during preparation of composition |
| Shrinkage Percent (%) | | | 6.2 | 3.6 | 8.3 | |
| Average Coefficient of Linear Expansion (ppm) | | | 57.9 | 57.4 | 84.3 | |
| Light Transmittance at 400 nm (%) | | | 87.7 | 88.0 | 88.9 | |

| | | | Comparative Example 10 | Comparative Example 11 | Comparative Example 12 | Comparative Example 13 |
|---|---|---|---|---|---|---|
| | Composition of Curable Composition | | Y-10 | Y-11 | Y-12 | Y-13 |
| Silica Fine Particles (A) or Silica Fine Particles Whose Surfaces Have Not Been Modified | Silica Fine Particles | Silica Particle Diameter (nm) | 40 10 | 40 10 | 40 10 | 40 10 |
| | Silane Compound Used for Surface-modification of Silica Fine Particles | Silane Compound (A1) | MOS | | | |
| | | Silane Compound (A2) | PhS | | 24 | 12 |
| | | | MPS | 24 | | 18 |
| | | | VTS | | 16 | 16 |
| (Meth)acrylate Compound (B) | (Meth)acrylate (B1) | TMPTA APG700 | 30 | 30 | 30 | 30 |
| | (Meth)acrylate (B2) | ADMA IRR214K | 30 | 30 | 30 | 30 |
| Polymerization Initiator (C) | Polymerization System | | | | Photo curing | Photo curing |
| Properties of Curable Composition | | | | | | |
| Viscosity at 25° C. (mPa · s) | | | Gelation during preparation of composition | Gelation After allowed to stand still at room temperature for 1 week | 678 | 550 |
| Shrinkage Percent (%) | | | | | 4.2 | 4.9 |
| Average Coefficient of Linear Expansion (ppm) | | | | | 63.5 | 69.4 |
| Light Transmittance at 400 nm (%) | | | | | 79.8 | 88.6 |

TABLE 4

| | | | Example 10 | Comparative Example 14 | Comparative Example 15 | Comparative Example 16 |
|---|---|---|---|---|---|---|
| | Composition of Curable Composition | | X-10 | Y-14 | Y-15 | Y-16 |
| Silica Fine Particles (A) or Silica Fine Particles Whose Surfaces Have Not Been Modified | Silica Fine Particles | Silica Particle Diameter (nm) | 50 10 | | 50 10 | 50 10 |
| | Silane Compound Used for Surace-modification of Silica Fine Particles | Silane Compound (A1) | MOS | 18 | | | |
| | | Silane Compound (A2) | PhS | 12 | | | 12 |
| | | | MPS | | | | 18 |
| | | | VTS | | | | |
| (Meth)acrylate Compound (B) | (Meth)acrylate (B1) | TMPTA APG700 | 25 | 50 | 25 | 25 |
| | (Meth)acrylate (B2) | ADMA IRR214K | 25 | 50 | 25 | 25 |
| Polymerization Initiator (C) | Polymerization System | | Thermal curing | Thermal curing | | Thermal curing |
| Properties of Curable Composition | | | | | | |
| Viscosity at 25° C. (mPa · s) | | | 3120 | 34 | Gelation during preparation of composition | 12629 |
| Shrinkage Percent (%) | | | 4.60 | 7.25 | | 8.64 |
| Average Coefficient of Linear Expansion (ppm) | | | 160 | 207 | | 137 |
| Light Transmittance at 400 nm (%) | | | 90.5 | 91.1 | | 90.3 |

TABLE 5

|  |  |  |  | Example 11 | Comparative Example 17 | Comparative Example 18 | Comparative Example 19 |
|---|---|---|---|---|---|---|---|
| Composition of Curable Composition |  |  |  | X-11 | Y-17 | Y-18 | Y-19 |
| Silica Fine Particles (A) or Silica Fine Particles Whose Surfaces Have Not Been Modified | Silica Fine Particles |  | Silica | 35 |  | 40 | 35 |
|  |  |  | Particle Diameter (nm) | 10 |  | 10 | 10 |
|  | Silane Compound Used for Surface-modification of Silica Fine Particles | Silane Compound (A1) | MOS | 18 |  |  |  |
|  |  | Silane Compound (A2) | PhS | 12 |  |  | 12 |
|  |  |  | MPS |  |  |  | 18 |
|  |  |  | VTS |  |  |  |  |
| (Meth)acrylate Compound (B) | (Meth)acrylate (B1) |  | TMPTA | 55 | 83 | 50 | 55 |
|  |  |  | APG700 |  |  |  |  |
|  | (Meth)acrylate (B2) |  | ADMA |  |  |  |  |
|  |  |  | IRR214K | 10 | 17 | 10 | 10 |
| Polymerization Initiator (C) | Polymerization System |  |  | Thermal curing | Thermal curing |  | Thermal curing |
| Properties of Curable Composition |  |  |  |  |  |  |  |
| Viscosity at 25° C. (mPa·s) |  |  |  | 50 | 119 | Gelation during preparation of composition | 60 |
| Shrinkage Percent (%) |  |  |  | 7.33 | 10.29 |  | 7.43 |
| Average Coefficient of Linear Expansion (ppm) |  |  |  | 73.4 | 88.8 |  | 80.4 |
| Light Transmittance at 400 nm (%) |  |  |  | 90.2 | 90.6 |  | 90.0 |

TABLE 6

|  |  |  |  | Example 12 | Comparative Example 20 | Comparative Example 21 | Comparative Example 22 |
|---|---|---|---|---|---|---|---|
| Composition of Curable Composition |  |  |  | X-12 | Y-20 | Y-21 | Y-22 |
| Silica Fine Particles (A) or Silica Fine Particles Whose Surfaces Have Not Been Modified | Silica Fine Particles |  | Silica | 40 |  | 40 | 40 |
|  |  |  | Particle Diameter (nm) | 10 |  | 10 | 10 |
|  | Silane Compound Used for Surface-modification of Silica Fine Particles | Silane Compound (A1) | MOS | 18 |  |  |  |
|  |  | Silane Compound (A2) | PhS | 12 |  |  | 12 |
|  |  |  | MPS |  |  |  | 18 |
|  |  |  | VTS |  |  |  |  |
| (Meth)acrylate Compound (B) | (Meth)acrylate (B1) |  | TMPTA | 60 | 100 | 60 | 60 |
|  |  |  | APG700 |  |  |  |  |
|  | (Meth)acrylate (B2) |  | ADMA |  |  |  |  |
|  |  |  | IRR214K |  |  |  |  |
| Polymerization Initiator (C) | Polymerization System |  |  | Thermal curing | Thermal curing |  |  |
| Properties of Curable Composition |  |  |  |  |  |  |  |
| Viscosity at 25° C. (mPa·s) |  |  |  | 1350 | 117 | Gelation during preparation of composition | Gelation during preparation of composition |
| Shrinkage Percent (%) |  |  |  | 6.94 | 10.84 |  |  |
| Average Coefficient of Linear Expansion (ppm) |  |  |  | 61.7 | 80.4 |  |  |
| Light Transmittance at 400 nm (%) |  |  |  | 90.2 | 90.6 |  |  |

TABLE 7

|  |  |  |  | Example 13 | Comparative Example 23 | Comparative Example 24 | Comparative Example 25 |
|---|---|---|---|---|---|---|---|
| Composition of Curable Composition |  |  |  | X-13 | Y-23 | Y-24 | Y-25 |
| Silica Fine Particles (A) or Silica Fine Particles Whose Surfaces Have Not Been Modified | Silica Fine Particles |  | Silica | 45 |  | 45 | 45 |
|  |  |  | Particle Diameter (nm) | 10 |  | 10 | 10 |
|  | Silane Compound Used for Surface-modification of Silica Fine Particles | Silane Compound (A1) | MOS | 18 |  |  |  |
|  |  | Silane Compound (A2) | PhS | 12 |  |  | 12 |
|  |  |  | MPS |  |  |  | 18 |
|  |  |  | VTS |  |  |  |  |
| (Meth)acrylate Compound (B) | (Meth)acrylate (B1) |  | TMPTA |  |  |  |  |
|  |  |  | APG700 |  |  |  |  |
|  | (Meth)acrylate (B2) |  | ADMA | 55 | 100 | 55 | 55 |
|  |  |  | IRR214K |  |  |  |  |
| Polymerization Initiator (C) | Polymerization System |  |  | Photo curing | Photo curing |  |  |

TABLE 7-continued

|  | Example 13 | Comparative Example 23 | Comparative Example 24 | Comparative Example 25 |
|---|---|---|---|---|
| Properties of Curable Composition | | | | |
| Viscosity at 25° C. (mPa · s) | 2035 | 14 | Gelation during preparation of composition | Gelation during preparation of composition |
| Shrinkage Percent (%) | 4.0 | 5.8 | | |
| Average Coefficient of Linear Expansion (ppm) | 80.9 | Film was brittle. Measurement was impossible | | |
| Light Transmittance at 400 nm (%) | 89.5 | 89.5 | | |

TABLE 8

| | | | | Example 14 | Example 15 | Example 16 | Comparative Example 26 | Comparative Example 27 | Comparative Example 28 | Comparative Example 29 |
|---|---|---|---|---|---|---|---|---|---|---|
| Composition of Curable Composition | | | | X-14 | X-15 | X-16 | Y-26 | Y-27 | Y-28 | Y-29 |
| Silica Fine Particles (A) or Silica Fine Particles Whose Surfaces Have Not Been Modified | Silica Fine Particles | | Silica Particle Diameter (nm) | 50 10 | 50 200 | 50 500 | Y-26 | 50 10 | 50 200 | 50 500 |
| | Silane Compound Used for Surface-modification of Silica Fine Particles | Silane Compound (A1) | MOS | 18 | 18 | 18 | | | | |
| | | Silane Compound (A2) | PhS MPS VTS | 12 | 12 | 12 | | | | |
| (Meth)acrylate Compound (B) | (Meth)acrylate (B1) | | TMPTA APG700 | 50 | 50 | 50 | 100 | 50 | 50 | 50 |
| | (Meth)acrylate (B2) | | ADMA IRR214K | | | | | | | |
| Polymerization Initiator (C) | Polymerization System | | | Photo curing | Photo curing | Photo curing | Photo curing | | | |
| Properties of Curable Composition | | | | | | | | | | |
| Viscosity at 25° C. (mPa · s) | | | | 2450 | 480 | 510 | 68 | Gelation during preparation of composition | Partial gelation during preparation of composition | Partial gelation during preparation of composition |
| Shrinkage Percent (%) | | | | 3.37 | 2.95 | 3.27 | 5.06 | | | |
| Average Coefficient of Linear Expansion (ppm) | | | | 174 | 185 | 174 | 267 | | | |
| Light Transmittance at 400 nm (%) | | | | 84.5 | 48.6 | 0.85 | 87.9 | | | |

| | | | | Comparative Example 30 | Comparative Example 31 | Comparative Example 32 |
|---|---|---|---|---|---|---|
| Composition of Curable Composition | | | | Y-30 | Y-31 | Y-32 |
| Silica Fine Particles (A) or Silica Fine Particles Whose Surfaces Have Not Been Modified | Silica Fine Particles | | Silica Particle Diameter (nm) | 50 10 | 50 200 | 50 500 |
| | Silane Compound Used for Surface-modification of Silica Fine Particles | Silane Compound (A1) | MOS | | | |
| | | Silane Compound (A2) | PhS MPS VTS | 12 18 | 12 18 | 12 18 |
| (Meth)acrylate Compound (B) | (Meth)acrylate (B1) | | TMPTA APG700 | 50 | 50 | 50 |
| | (Meth)acrylate (B2) | | ADMA IRR214K | | | |
| Polymerization Initiator (C) | Polymerization System | | | Photo curing | Photo curing | Photo curing |
| Properties of Curable Composition | | | | | | |
| Viscosity at 25° C. (mPa · s) | | | | 13590 | 578 | 516 |
| Shrinkage Percent (%) | | | | 3.31 | 3.05 | 3.66 |
| Average Coefficient of Linear Expansion (ppm) | | | | 189 | 200 | 176 |
| Light Transmittance at 400 nm (%) | | | | 65.8 | 34.6 | 0.54 |

The unit of values indicated in the tables for the silica fine particles, the silane compounds (A1) and (A2) and the (meth)acrylates (B1) and (B2) is part(s) by mass. The amount of the silane compounds (A1) and (A2) is of the silane compounds used for the surface modification of 100 parts of silica fine particles before surface-modified. The amount of the silica fine particles and the amount of the (meth)acrylate (B1) and the (meth)acrylate (B2) are set such that the total of these amounts represent 100 parts. The amount of the silica fine particles refers to the mass of ones in terms of silica fine particles before surface-modified in the case of the surface-modified silica fine particles (A); and refers to the mass of silica fine particles themselves in the case of unmodified silica fine particles.

In the tables, silica fine particles having a particle diameter described as being 10 nm refer to an isopropyl alcohol dispersion-type colloidal silica (silica fine particles content: 30% by mass, an average particle diameter: 10 to 20 nm, product name: SNOWTEX IPA-ST; manufactured by Nissan Chemical Industries, Ltd.); silica fine particles having a particle diameter described as being 200 nm refer to a methyl ethyl ketone dispersion-type colloidal silica (silica fine particles content: 40% by mass, an average particle diameter: 200 nm, product name: SNOWTEX MEK-ST-2040; manufactured by Nissan Chemical Industries, Ltd.); and silica fine particles having a particle diameter described as being 500 nm refer to an isopropyl alcohol dispersion-type spherical silica (silica fine particles content: 60% by mass, an average particle diameter: 500 nm, product name: ADMAFINE SC-2050; manufactured by Admatechs).

The meaning of the symbol for each silane compound indicated in the tables is as follows.
MOS: 8-methacryloyloxyoctyltrimethoxysilane
PhS: phenyltrimethoxysilane
MPS: 3-methacryloyloxypropyltrimethoxysilane
VTS: vinyltrimethoxysilane The meaning of the symbol for each (meth)acrylate compounds (B) indicated in the tables is as follows.
TMPTA: trimethylolpropane triacrylate (trifunctional monomer; manufactured by Nippon Kayaku Co., Ltd.)
APG700: polypropylene glycol (#700) diacrylate (bifunctional monomer; product name: NKester APG-700: manufactured by Shin-Nakamura Chemical Co., Ltd.)
ADMA: adamantyl methacrylate (monofunctional monomer; manufactured by Osaka Organic Chemical Industries, Ltd.)
IRR214K: dimethyloltricyclodecane diacrylate (bifunctional monomer; product name: IRR214-K; manufactured by DAICEL-CYTEC Company, Ltd.)

<<Regarding Tables 1 and 2>>

The curable compositions (X-1) to (X-7) have moderate viscosity, excellent handling property and reduced curing shrinkage. Further, the cured products obtained by thermally polymerizing the curable compositions (X-1) to (X-7) have lower average coefficient of linear expansion and higher light transmittance. By contrast, the cured product obtained from the curable composition (Y-1) containing no silica fine particles generally has higher average coefficient of linear expansion and higher shrinkage percent than the cured products obtained from the curable compositions (X-1) to (X-7). The curable composition (Y-2) in which the silica fine particles were not surface-modified gelated. Thus, the surface-modification of the silica fine particles with the silane compound (A1) allows the silica fine particles to have improved dispersion stability.

The curable composition (Y-3) obtained by surface-modifying the silica fine particles with PhS alone has significantly higher viscosity than the curable composition (X-1) obtained by surface-modifying the silica fine particles with MOS alone. The cured product obtained from the curable composition (Y-3) has lower transmittance than the transmittance of the cured product obtained from the curable composition (X-1). The curable composition (Y-4) obtained by surface-modifying the silica fine particles with MPS alone has higher viscosity as well as inferior coefficient of linear expansion and shrinkage percent than the curable composition (X-1) obtained by surface-modifying the silica fine particles with MOS alone. Thus, the surface-modification of the silica fine particles with the silane compound (A1) leads to the provision of the curable composition with improved dispersion stability, reduced viscosity and excellent handling property, and allows the cured product to have improved heat resistance.

When the curable composition (X-2) in which the silica fine particles were surface-modified with MOS and PhS is compared with the curable composition (Y-5) in which the silica fine particles were surface-modified with MPS and PhS, the curable composition (Y-5) gelated. The curable composition (Y-6) containing increased amount of the silica fine particles, too, gelated. Thus, the surface-modification of the silica fine particles with the silane compound (A1) leads to the provision of the curable composition with improved dispersion stability, reduced viscosity and excellent handling property.

When the curable composition (X-7) containing decreased amount of the silica fine particles is compared with the curable composition (Y-7), the cured product of the curable composition (X-7) has lower shrinkage percent than the cured product of the curable composition (Y-7). Thus, the surface-modification of the silica fine particles with the silane compound (A1) leads to the provision of the curable composition with higher moldability.

<<Regarding Table 3>>

The curable compositions (X-8) and (X-9) have moderate viscosity, excellent handling property and reduced curing shrinkage. Further, the cured products obtained by photopolymerizing the curable compositions (X-8) and (X-9) have lower average coefficient of linear expansion and higher light transmittance. By contrast, the cured product obtained from the curable composition (Y-8) containing no silica fine particles has higher average coefficient of linear expansion and higher shrinkage percent than the cured product obtained from the curable compositions (X-8) and (X-9). Thus, the surface-modification of the silica fine particles with the silane compound (A1) allows the cured product to have improved heat resistance.

The curable composition (Y-9) in which the silica fine particles were not surface-modified gelated. Thus, the surface-modification of the silica fine particles with the silane compound (A1) improves the dispersion stability of the silica fine particles.

The curable compositions (Y-10) and (Y-11) obtained by surface-modifying the silica fine particles with MPS alone or VTS alone gelated. Thus, the surface-modification of the silica fine particles with the silane compound (A1) leads to the provision of the curable composition with improved dispersion stability, reduced viscosity and excellent handling property.

When the curable composition (X-9) in which the silica fine particles were surface-modified with MOS and PhS is compared with the curable composition (Y-12) in which the silica fine particles were surface-modified with VTS and PhS, the cured product obtained from the curable composition (X-9) has higher transmittance than the transmittance of the curable composition (Y-12). When the curable composition (X-9) in which the silica fine particles were surface-modified with MOS and PhS is compared with the curable composition (Y-13) in which the silica fine particles were surface-modified with MPS and PhS, the cured product of the curable composition (X-9) has lower average coefficient of linear expansion than the average coefficient of linear expansion of the cured product of the curable composition (Y-13). Thus, the surface-modification of the silica fine particles with the silane compound (A1) allows the cured product to have improved heat resistance and transparency.

<<Regarding Table 4>>

The curable composition (X-10) has moderate viscosity, excellent handling property and reduced curing shrinkage. Further, the cured product obtained by thermally polymerizing the curable composition (X-10) has higher light transmittance. By contrast, the curable composition (Y-14) containing no silica fine particles has higher shrinkage percent than the cured product of the curable composition (X-10). Thus, the incorporation of the silica fine particles surface-modified with the silane compound (A1) leads to the provision of the curable composition with lower shrinkage percent and excellent moldability.

The curable composition (Y-15) in which the silica fine particles were not surface-modified gelated. Thus, the surface-modification of the silica fine particles with the silane compound (A1) leads to the provision of the curable composition with improved dispersion stability, reduced viscosity and excellent handling property.

When the curable composition (X-10) in which the silica fine particles were surface-modified with MOS and PhS is compared with the curable composition (Y-16) in which the silica fine particles were surface-modified with MPS and PhS, the curable composition (X-10) has lower viscosity and lower shrinkage percent. Thus, the surface-modification of the silica fine particles with the silane compound (A1) leads to the provision of the curable composition with improved dispersion stability, reduced viscosity and excellent handling property as well as with lower shrinkage percent and higher moldability.

<<Regarding Table 5>>

The cured product obtained by thermally polymerizing the curable composition (X-11) has lower average coefficient of linear expansion and higher light transmittance. By contrast, the curable composition (Y-17) containing no silica fine particles has higher shrinkage percent than the curable composition (X-11). Further, its cured product has higher average coefficient of linear expansion. Thus, the incorporation of the silica fine particles surface-modified with the silane compound (A1) leads to the provision of the curable composition with lower shrinkage percent and excellent moldability.

The curable composition (Y-18) in which the silica fine particles were not surface-modified gelated. Thus, the surface-modification of the silica fine particles with the silane compound (A1) leads to the provision of the curable composition with improved dispersion stability, reduced viscosity and excellent handling property.

When the curable composition (X-11) in which the silica fine particles were surface-modified with MOS and PhS is compared with the curable composition (Y-19) in which the silica fine particles were surface-modified with MPS and PhS, the cured product of the curable composition (X-11) has lower average coefficient of linear expansion than the cured product of the curable composition (Y-19). Thus, the surface-modification of the silica fine particles with the silane compound (A1) leads to improved heat resistance.

<<Regarding Table 6>>

The curable composition (X-12) has moderate viscosity and excellent handling property. The cured product obtained by thermally polymerizing the curable composition (X-12) has lower average coefficient of linear expansion and higher light transmittance. By contrast, the curable composition (Y-20) containing no silica fine particles has higher shrinkage percent than the curable composition (X-11). Further, its cured product has higher average coefficient of linear expansion. Thus, the incorporation of the silica fine particles surface-modified with the silane compound (A1) leads to the provision of the curable composition with lower shrinkage percent and excellent moldability and the cured product with improved heat resistance.

The composition (Y-21) in which the silica fine particles were not surface-modified gelated. Thus, the surface-modification of the silica fine particles with the silane compound (A1) lead to the provision of the curable composition with improved dispersion stability, reduced viscosity and excellent handling property.

The curable composition (Y-22) containing the silica fine particles surface-modified with MPS and PhS gelated. Thus, the surface-modification of the silica fine particles with the silane compound (A1) leads to the provision of the curable composition with improved dispersion stability, reduced viscosity and excellent handling property.

<<Regarding Table 7>>

The curable composition (X-13) has moderate viscosity, excellent handling property and reduced curing shrinkage. The cured product obtained by photopolymerizing the curable composition (X-13) has higher light transmittance. By contrast, the cured product of the curable composition (Y-23) containing no silica fine particles was brittle and was easily crackable, and thus was not suitable for the measurement of average coefficient of linear expansion. Thus, the incorporation of the silica fine particles surface-modified with the silane compound (A1) leads to the provision of the curable composition with excellent moldability.

The curable composition (Y-24) in which the silica fine particles were not surface-modified gelated. Thus, the surface-modification of the silica fine particles with the silane compound (A1) leads to the provision of the curable composition with improved dispersion stability, reduced viscosity and excellent handling property.

The curable composition (Y-25) in which the silica fine particles were surface-modified with MPS and PhS gelated. Thus, the surface-modification of the silica fine particles with the silane compound (A1) leads to the provision of the curable composition with improved dispersion stability, reduced viscosity and excellent handling property.

<<Regarding Table 8>>

The curable compositions (X-14) to (X-16) have moderate viscosity, excellent handling property and reduced curing shrinkage. By contrast, the curable composition (Y-26) containing no silica fine particles has higher shrinkage percent than the curable composition (X-14). The cured product of the curable composition (Y-26) has higher average coefficient of linear expansion than the cured product of the curable composition (X-14). Thus, the incorporation of the silica fine particles surface-modified with the silane compound (A1) leads to the provision of the curable composition with excellent moldability and the cured product with improved heat resistance.

The curable compositions (Y-27) to (Y-29) in which the silica fine particles were not surface-modified gelated. Thus, the surface-modification of the silica fine particles with the silane compound (A1) leads to the provision of the curable composition with improved dispersion stability, reduced viscosity and excellent handling property.

The curable composition (Y-30) in which the silica fine particles were surface-modified with MPS and PhS has significantly higher viscosity than the curable composition (X-14). The curable composition (Y-31) in which the silica fine particles having an average particle diameter of about 200 nm were surface-modified with MPS and PhS gives a cured product having higher average coefficient of linear expansion than the cured product of the curable composition (X-15). The curable composition (Y-32) in which the silica fine particles having an average particle diameter of about 500 nm were surface-modified with MPS and PhS has higher shrinkage percent than the curable composition (X-16). Thus, the surface-modification of the silica fine particles with the silane compound (A1) leads to the provision of the curable composition with improved dispersion stability, reduced viscosity and excellent handling property as well as with lower shrinkage percent and improved moldability and moreover the cured product with improved heat resistance.

The cured product obtained by curing the curable composition of the present invention has excellent transparency and heat resistance as well as has lower linear expansion property. This cured product can be used suitably for optical materials and electronic materials such as transparent plates, optical lenses, optical disk substrates, plastic substrates for liquid crystal display elements, substrates for color filters, plastic substrates for organic EL display elements, substrates for solar cells, touch panels, optical elements, optical waveguides and LED sealing materials.

The invention claimed is:

1. A curable composition comprising:
   (A) silica fine particles surface-modified with silane compounds that comprise (A1) a polymerizable silane compound represented by the following general formula (1) and (A2) a silane compound different from the polymerizable silane compound (A1),
   (B) (meth)acrylate compounds comprising (B1) a (meth)acrylate compound having at least one (meth)acryloyloxy group and having no cyclic structures and (B2) a (meth)acrylate compound having at least one(meth)acryloyloxy group and having an alicylic structure, and
   (C) a polymerization initiator, $$SiR^1_a R^2_b R^3_c (OR^4)_{4-a-b-c} \quad (1)$$

wherein $R^1$ is a hydrocarbon group having 11 to 20 carbon atoms that has an ethylenic unsaturated group, or a substituted hydrocarbon group having 11 to 20 carbon atoms that has an ethylenic unsaturated group and has an ether bond and/or an ester bond; $R^2$ is a hydrogen atom or a hydrocarbon group having 1 to 4 carbon atoms; $R^3$ is a halogen atom; $R^4$ is a hydrogen atom or a hydrocarbon group having 1 to 10 carbon atoms; a is an integer of 1 to 3; b is an integer of 0 to 2; c is an integer of 0 to 3; the sum of a and b is 1 to 3; the sum of a, b and c is 1 to 4; when a is 2 or more, multiple $R^1$ may be the same or different from each other; when b is 2, multiple $R^2$ may be the same or different from each other; when c is 2 or more, multiple $R^3$ may be the same or different from each other; and when the sum of a, b and c is 1 or 2, multiple $R^4$ may be the same or different from each other.

2. The curable composition according to claim 1, wherein the polymerizable silane compound (A1) is (A1') a polymerizable silane compound represented by the following general formula (1'),

(1')

wherein $R^2$ to $R^4$ are each synonymous with the same symbol in the formula (1); $R^5$ is a hydrogen atom or a methyl group; d is an integer of 8 to 16; e is an integer of 0 to 2; f is an integer of 0 to 3; the sum of e and f is 0 to 3; when e is 2, multiple $R^2$ may be the same or different from each other; when f is 2 or more, multiple $R^3$ may be the same or different from each other; and when the sum of e and f is 0 or 1, multiple $R^4$ may be the same or different from each other.

3. The curable composition according to claim 1, wherein the silane compound used for surface-modification does not comprise (A2') a polymerizable silane compound represented by the following general formula (2'),

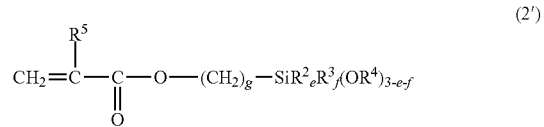

(2')

wherein $R^2$ to $R^5$ and e and f are each synonymous with the same symbol in the formula (1'); when $R^5$ is a hydrogen atom, g is an integer of 1 to 7; and when $R^5$ is a methyl group, g is an integer of 1 to 6.

4. The curable composition according to claim 1, wherein the amount of the silica fine particles (A) in terms of silica fine particles before surface modification is 1 to 90 parts by mass with respect to 100 parts by mass of the total amount of the silica fine particles (A) in terms of the silica fine particles before surface modification and the (meth)acrylate compound (B).

5. The curable composition according to claim 1, wherein the silica fine particles (A) are silica fine particles surface-modified with 5 to 100 parts by mass of the silane compound with respect to 100 parts by mass of the silica fine particles before surface modification.

6. The curable composition according to claim 1, wherein the amount of the polymerizable silane compound (A1) is 1 to 100% by mass with respect to the whole amount of the silane compound used for the surface-modification in the silica fine particles (A).

7. The curable composition according to claim 1, wherein the (meth)acrylate compound (B1) has two or more (meth)acryloyloxy groups.

8. The curable composition according to claim 1, wherein the (meth)acrylate compound (B2) has one to three (meth)acryloyloxy groups.

9. A cured product obtainable by curing the curable composition according to claim 1.

10. An optical material comprising the cured product according to claim 9.

11. An electronic material comprising the cured product according to claim 9.

* * * * *